US010209531B2

(12) United States Patent
Okuyama

(10) Patent No.: US 10,209,531 B2
(45) Date of Patent: Feb. 19, 2019

(54) OPTICAL DEVICE AND DISPLAY DEVICE

(71) Applicant: Japan Display Inc., Tokyo (JP)

(72) Inventor: Kentaro Okuyama, Tokyo (JP)

(73) Assignee: Japan Display Inc., Tokyo (JP)

(*) Notice: Subject to any disclaimer, the term of this patent is extended or adjusted under 35 U.S.C. 154(b) by 206 days.

(21) Appl. No.: 15/416,516

(22) Filed: Jan. 26, 2017

(65) Prior Publication Data

US 2017/0219840 A1 Aug. 3, 2017

(30) Foreign Application Priority Data

Jan. 28, 2016 (JP) .................................. 2016-014322

(51) Int. Cl.
G02F 1/13363 (2006.01)
G02B 27/48 (2006.01)
G02F 1/133 (2006.01)
G02F 1/1334 (2006.01)
G02F 1/1335 (2006.01)
G02F 1/1337 (2006.01)
G02F 1/137 (2006.01)
G02F 1/1347 (2006.01)

(52) U.S. Cl.
CPC ............ *G02B 27/48* (2013.01); *G02F 1/137* (2013.01); *G02F 1/1334* (2013.01); *G02F 1/1337* (2013.01); *G02F 1/13306* (2013.01); *G02F 1/13363* (2013.01); *G02F 1/13476* (2013.01); *G02F 1/133528* (2013.01); *G02F 2001/13706* (2013.01); *G02F 2001/13712* (2013.01); *G02F 2001/13756* (2013.01); *G02F 2001/133638* (2013.01); *G02F 2001/133738* (2013.01); *G02F 2001/133742* (2013.01); *G02F 2203/07* (2013.01)

(58) Field of Classification Search
CPC .................................................. G02F 1/13363
See application file for complete search history.

(56) References Cited

U.S. PATENT DOCUMENTS

2009/0310087 A1* 12/2009 Itoh ........................ G02B 27/48
353/38
2010/0085510 A1 4/2010 Okuyama et al.
2011/0109663 A1 5/2011 Uchida et al.
2013/0258711 A1 10/2013 Okuyama et al.
2013/0314620 A1* 11/2013 Ebisui ................... G02F 1/1313
349/1

FOREIGN PATENT DOCUMENTS

JP 2007-163926 A 6/2007
JP 2008-076483 A 4/2008
(Continued)

Primary Examiner — Edmond Lau
(74) Attorney, Agent, or Firm — K&L Gates LLP

(57) ABSTRACT

According to one embodiment, an optical device includes a first light-modulating element transmitting or scattering light, and a second light-modulating element transmitting or scattering the light passing through the first light-modulating element, a driving module alternately performing a first mode of making the first light-modulating element scatter the light and making the second light-modulating element transmit the light, and a second mode of making the first light-modulating element transmit the light and making the second light-modulating element scatter the light.

20 Claims, 13 Drawing Sheets

(56) References Cited

FOREIGN PATENT DOCUMENTS

| | | |
|---|---|---|
| JP | 2010-092682 A | 4/2010 |
| JP | 2010-517070 A | 5/2010 |
| JP | 2010-217291 A | 9/2010 |
| JP | 2011-119210 A | 6/2011 |
| JP | 2012-141588 A | 7/2012 |
| JP | 5263593 B2 | 8/2013 |
| WO | 2008/087575 A1 | 7/2008 |

* cited by examiner

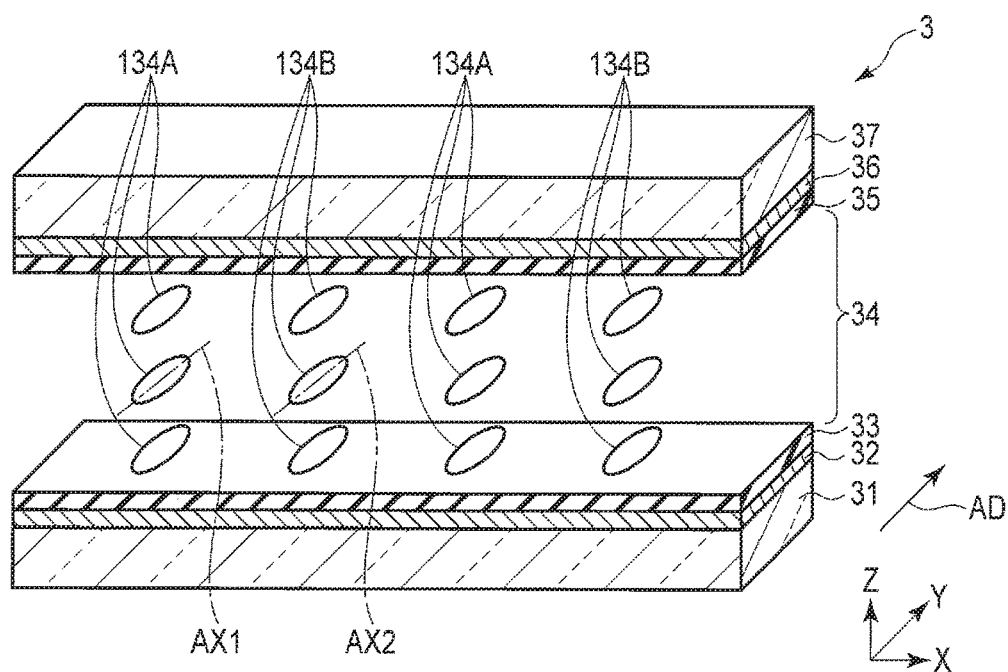
F I G. 4
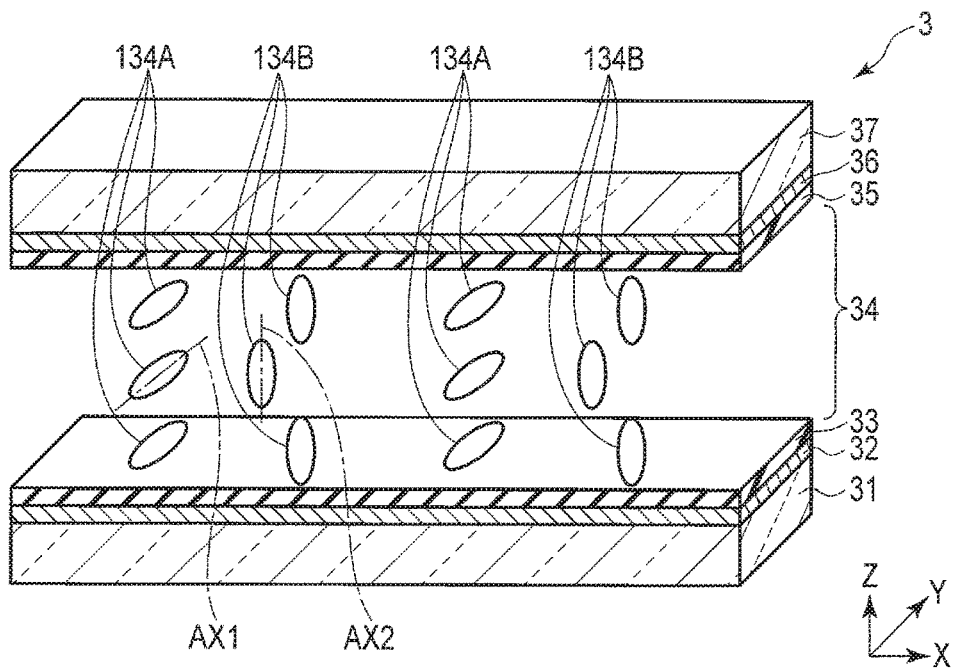
F I G. 5

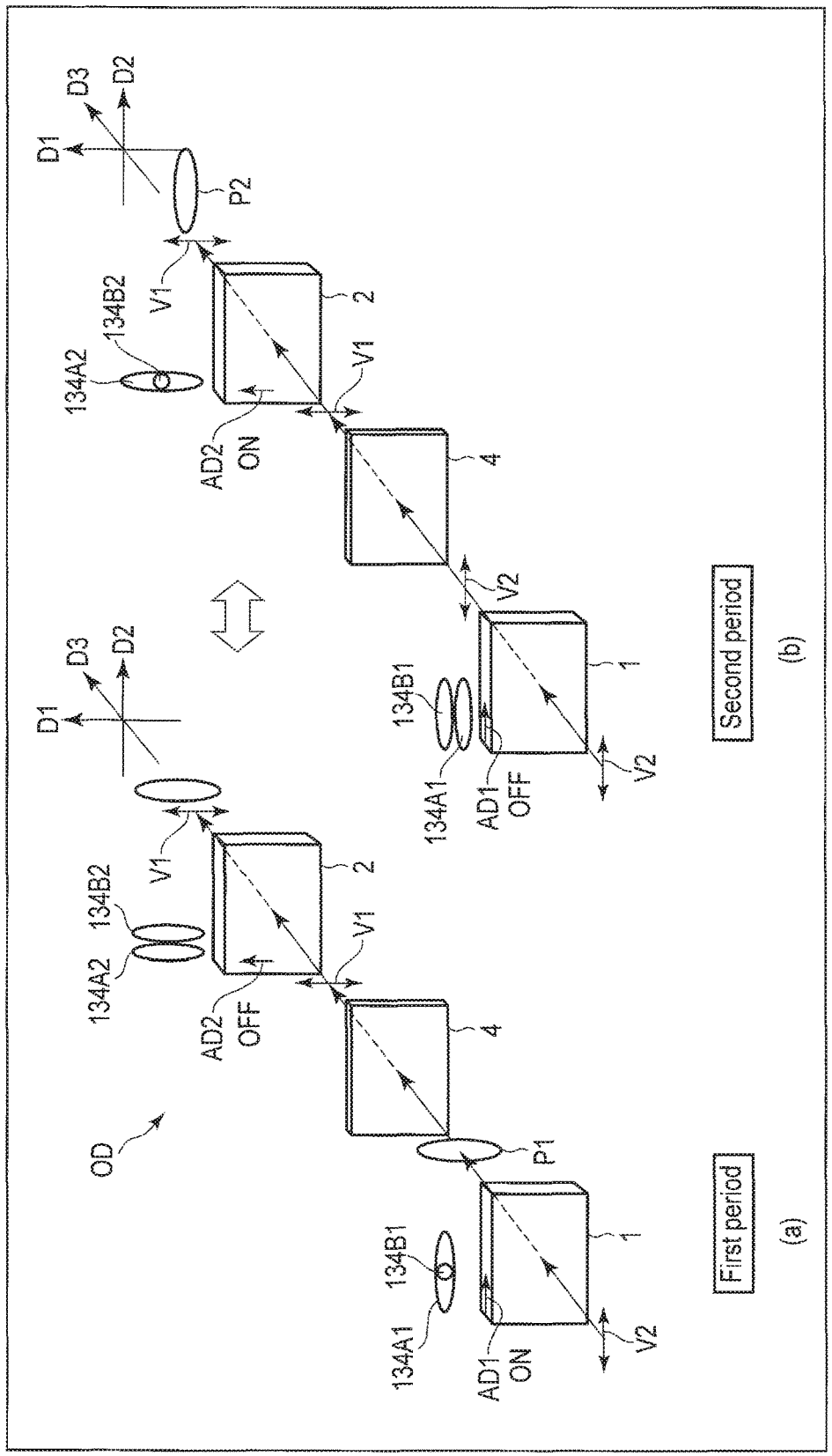
F I G. 10

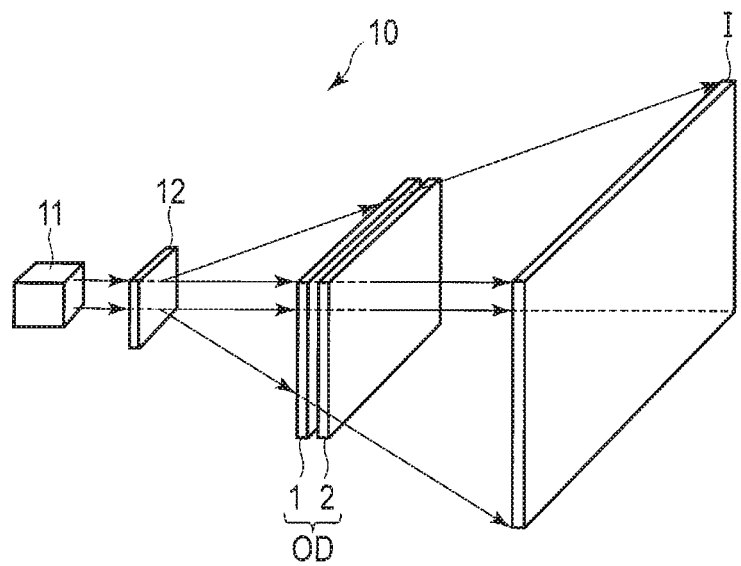
F I G. 11
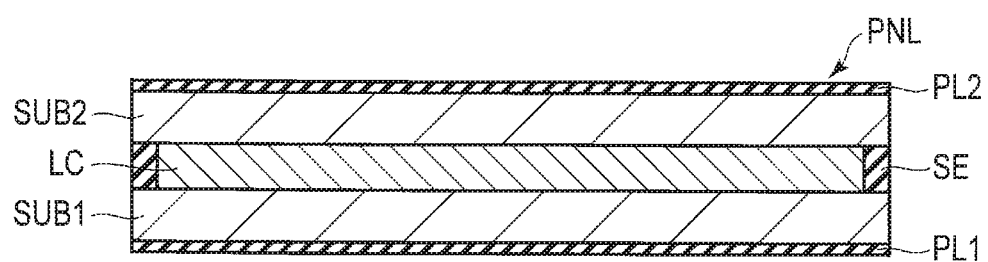
F I G. 12

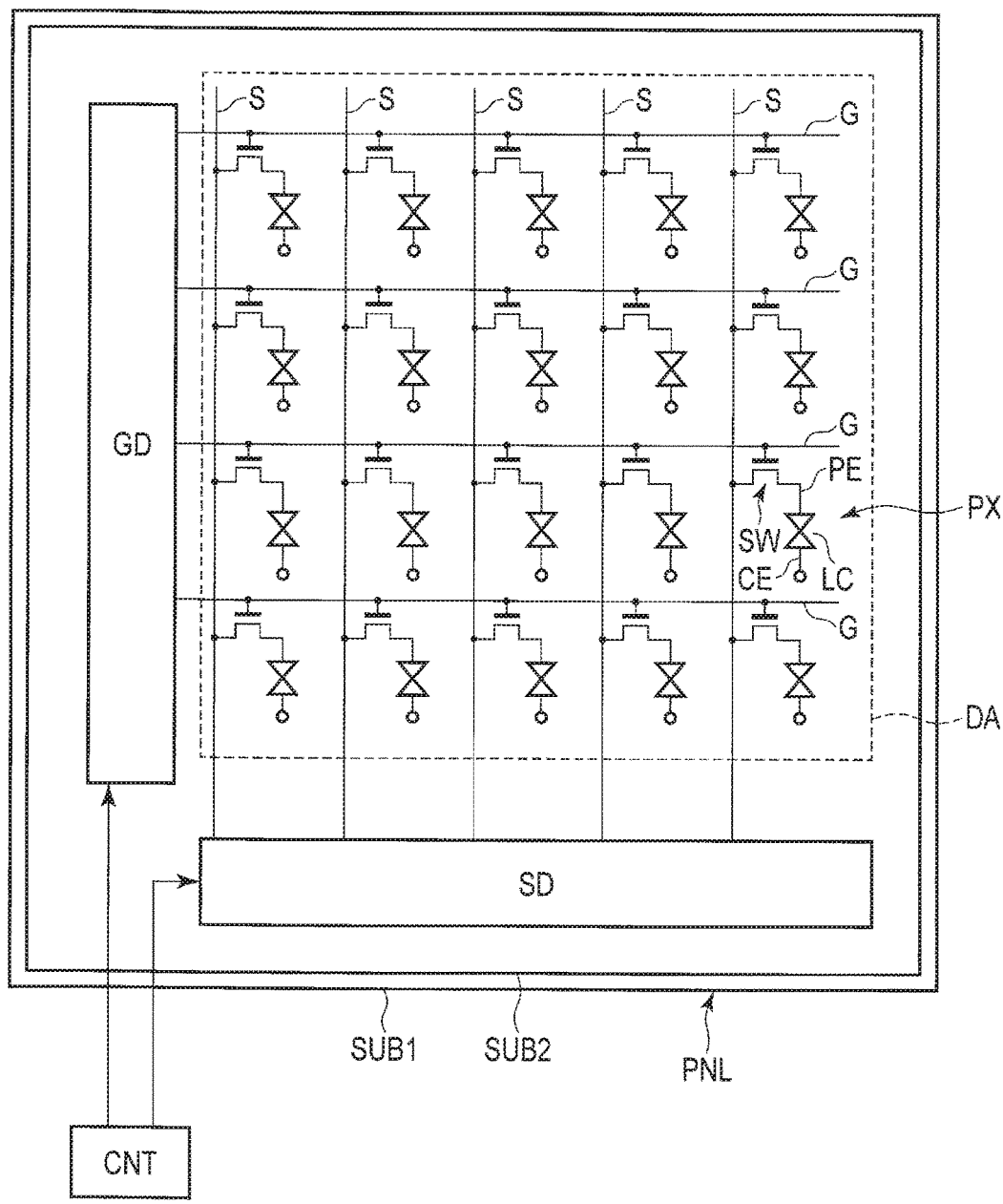
F I G. 13

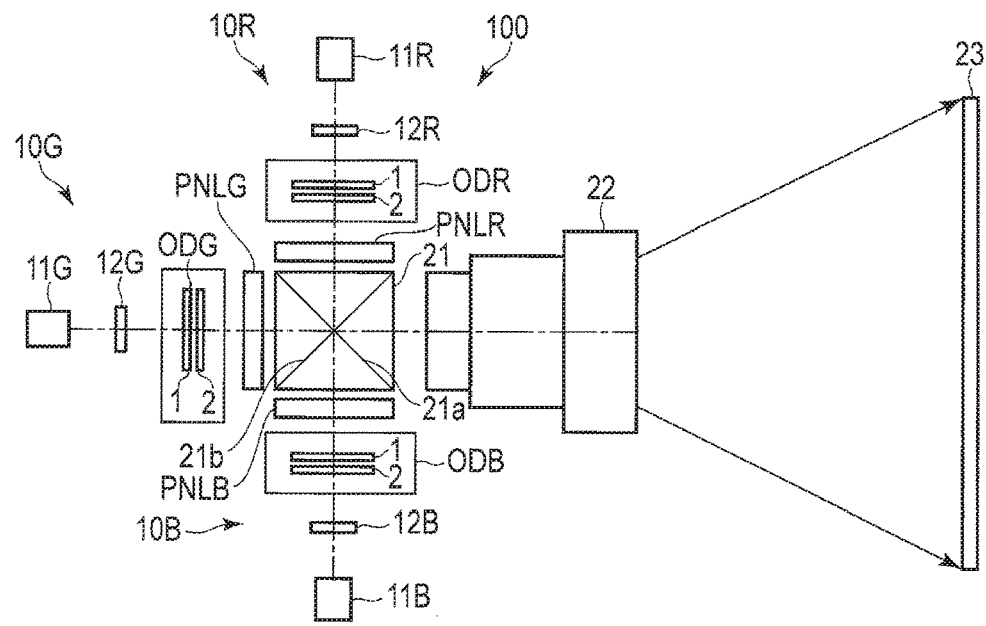
F I G. 14
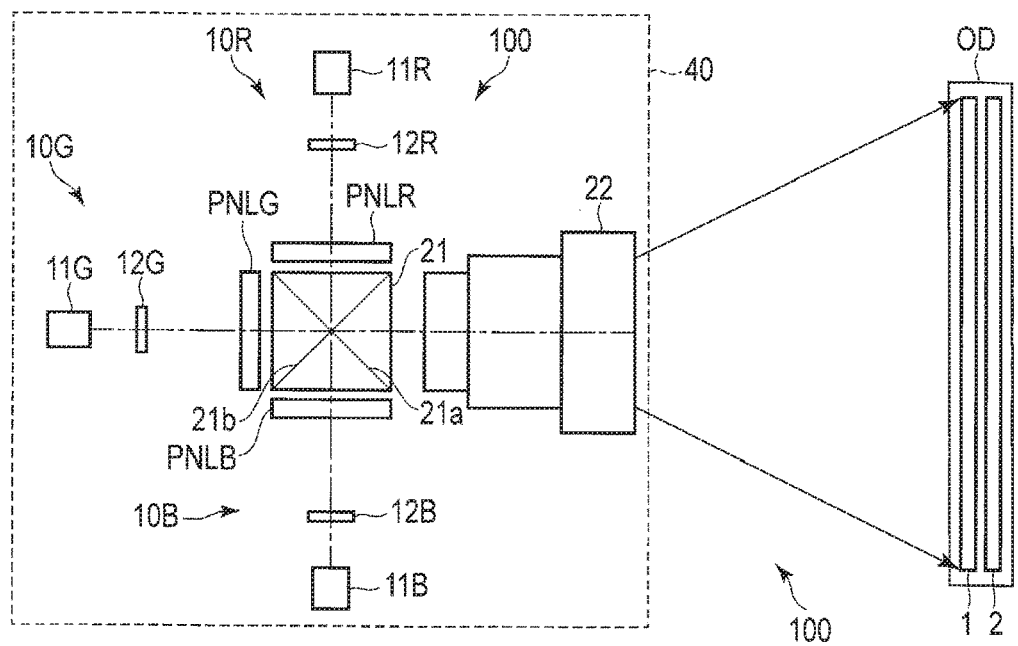
F I G. 15

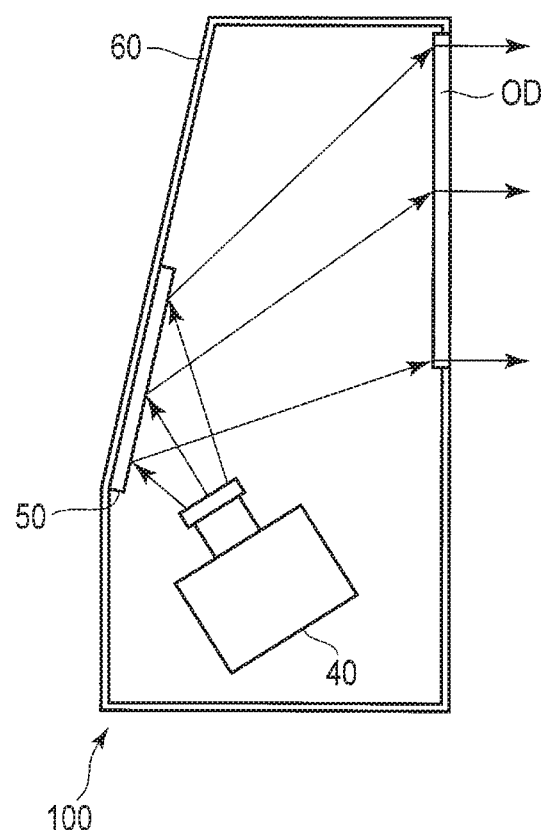
F I G. 16

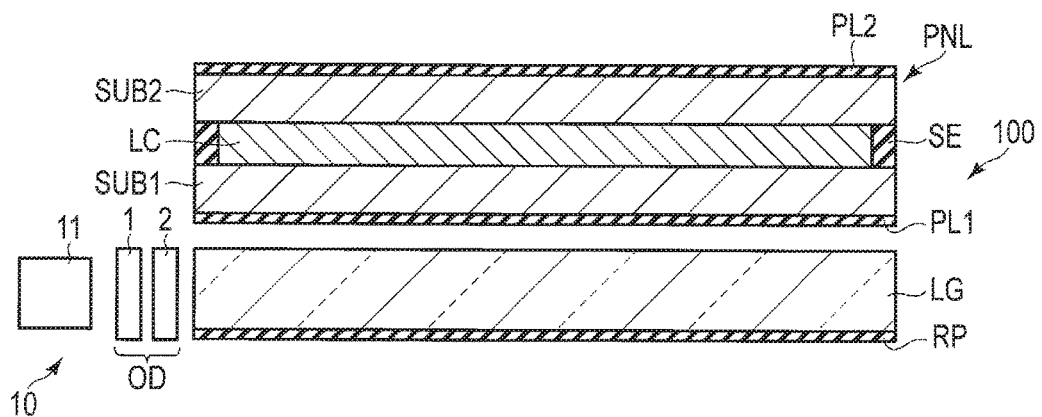
F I G. 17
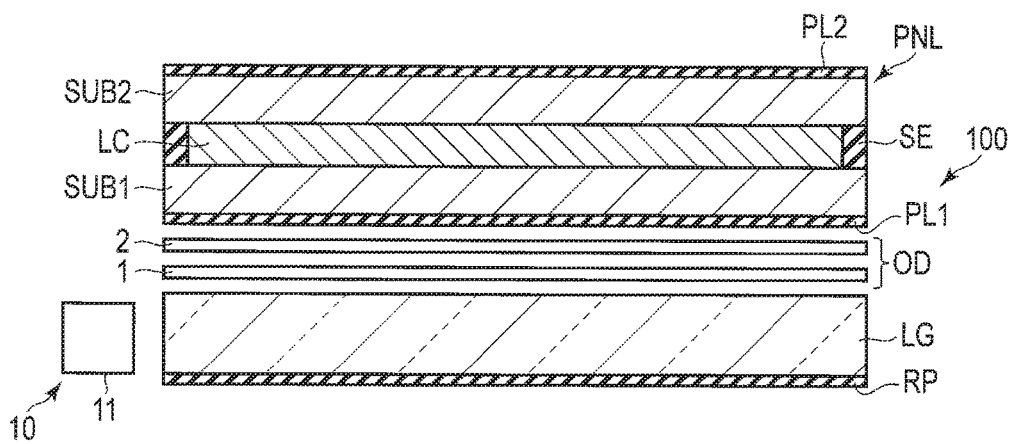
F I G. 18

OPTICAL DEVICE AND DISPLAY DEVICE

CROSS-REFERENCE TO RELATED APPLICATIONS

This application is based upon and claims the benefit of priority from Japanese Patent Application No. 2016-014322, filed Jan. 28, 2016, the entire contents of which are incorporated herein by reference.

FIELD

Embodiments described herein relate generally to an optical device and a display device.

BACKGROUND

Technologies of reducing speckle for display devices using laser light has been variously reviewed. However, a sufficient scattering property cannot be obtained, a scattering pattern cannot be spatially changed by isotropic scattering alone, and sufficiently reducing the speckle is difficult in any type of the technologies.

SUMMARY

The present application relates generally to an optical device and a display device.

In an embodiment, an optical device is provided. The optical device includes a first light-modulating element transmitting or scattering light; a second light-modulating element transmitting or scattering the light passing through the first light-modulating element; and a driving module driving the first light-modulating element and the second light-modulating element, wherein, a scattering direction of the first light-modulating element is a first direction, a scattering direction of the second light-modulating element is a second direction intersecting the first direction, the driving module alternately performs a first mode of making the first light-modulating element scatter the light and making the second light-modulating element transmit the light, and a second mode of making the first light-modulating element transmit the light and making the second light-modulating element scatter the light.

In an embodiment, a display device is provided. The display device includes an optical device and a display panel illuminated by the light emitted from the optical device.

Additional features and advantages are described herein, and will be apparent from the following Detailed Description and the figures.

BRIEF DESCRIPTION OF THE DRAWINGS

FIG. 4 is an illustration schematically showing a status in which an electric field is not applied to a light-modulating layer 34 in the light-modulating element 3 of a first configuration example.

FIG. 5 is an illustration schematically showing a status in which an electric field is applied to the light-modulating layer 34 in the light-modulating element 3 of the first configuration example.

FIG. 10 is an illustration showing another example of the optical device OD.

FIG. 11 is a perspective view showing a configuration example of a lighting unit 10.

FIG. 12 is a cross-sectional view showing a configuration example of a display panel PNL. A liquid crystal display panel will be explained here as an example of the display device PNL.

FIG. 13 is an illustration showing a configuration example of the display panel PNL shown in FIG. 12.

FIG. 14 is an illustration showing a first configuration example of a display device 100.

FIG. 15 is an illustration showing a second configuration example of the display device 100.

FIG. 16 is an illustration showing a third configuration example of the display device 100.

FIG. 17 is an illustration showing a fourth configuration example of the display device 100.

FIG. 18 is an illustration showing a fifth configuration example of the display device 100.

DETAILED DESCRIPTION

Figure 1:
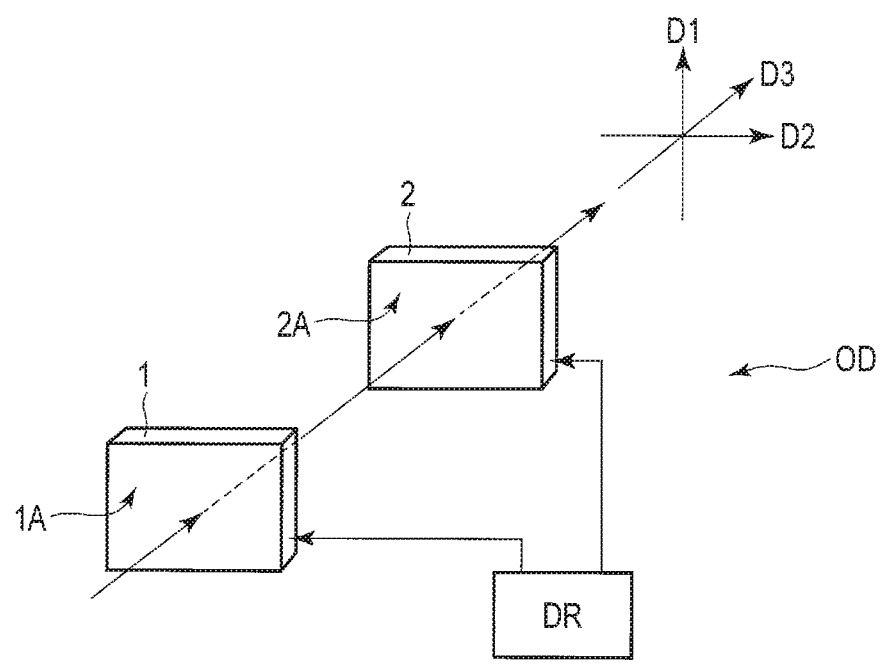
FIG. 1 is a perspective view showing a configuration example of an optical device OD of the embodiments.

In general, according to one embodiment, an optical device, includes: a first light-modulating element transmitting or scattering light; a second light-modulating element transmitting or scattering the light passing through the first light-modulating element; and a driving module driving the first light-modulating element and the second light-modulating element, wherein, a scattering direction of the first light-modulating element is a first direction, a scattering direction of the second light-modulating element is a second direction intersecting the first direction, the driving module alternately performs a first mode of making the first light-modulating element scatter the light and making the second light-modulating element transmit the light, and a second mode of making the first light-modulating element transmit the light and making the second light-modulating element scatter the light.

According to another embodiment, an optical device includes: a first light-modulating element; and a second light-modulating element, wherein a light passing through the first light-modulating element is incident to the second light-modulating element, each of the first light-modulating element and the second light-modulating element changes a transmitting mode of transmitting the light incident thereon and a scattering mode of scattering the light incident thereon, a scattering direction of the first light-modulating element is different from a scattering direction of the second light-modulating element, timing of setting the first light-modulating element to the scattering mode is different from timing of setting the second light-modulating element to the scattering mode.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, and the like of the respective parts are illustrated schematically in the drawings, rather than as an accurate representation of what is implemented, but such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

FIG. 1 is a perspective view showing a configuration example of an optical device OD of the embodiments. In FIG. 1, a first direction D1, a second direction D2 and a third direction D3 are orthogonal to each other. However, the first direction D1 and the second direction D2 may intersect each other at an angle other than ninety degrees. The third direction D3 corresponds to a direction of travel of light, and the first direction D1 and the second direction D2 correspond to directions in a plane intersecting the direction of travel of light. For example, the third direction D3 is parallel to a normal direction of a D1-D2 plane defined by the first direction D1 and the second direction D2.

The optical device OD comprises a first light-modulating element 1, a second light-modulating element 2, and a driving module DR. Each of the first light-modulating element 1 and the second light-modulating element 2 is configured to be shaped in, for example, a flat plate and includes main surfaces 1A and 2A parallel to the D1-D2 plane. In the example shown in FIG. 1, the third direction D3 is parallel to the normal directions of the main surfaces 1A and 2A. The first light-modulating element 1 and the second light-modulating element 2 are arranged in the third direction D3, the first light-modulating element 1 is located on an upstream side of the direction of travel of the light, and the second light-modulating element 2 is located on a downstream side of the direction of travel of the light.

Each of the first light-modulating element 1 and the second light-modulating element 2 is configured to transmit or scatter the light incident on itself in the third direction D3. In other words, each of the first light-modulating element 1 and the second light-modulating element 2 is configured to change a transmission status (transmission mode) of transmitting the incident light and a scattering status (scattering mode) of scattering the incident light. The scattering direction of the incident light scattered by the first light-modulating element 1 is different from the scattering direction of the incident light scattered by the second light-modulating element 2. For example, the scattering direction of the incident light scattered by the first light-modulating element 1 is the first direction D1, and the scattering direction of the incident light scattered by the second light-modulating element 2 is the second direction D2. The scattering direction is defined as a direction in which the degree of scattering is relatively large in the D1-D2 plane. In other words, the first light-modulating element 1 is configured such that the degree of scattering in the first direction D1 is larger than the degree of scattering in the second direction D2 in the scattering status, and the second light-modulating element 2 is configured such that the degree of scattering in the second direction D2 is larger than the degree of scattering in the first direction D1 in the scattering status.

In contrast, each of the first light-modulating element 1 and the second light-modulating element 2 is configured such that a diameter of the light to be made incident on itself is hardly different from a diameter of the light having transmitted itself, in the transmission status. In other words, a difference between the degree of scattering in the first direction D1 and the degree of scattering in the second direction D2 is substantially zero or minute, in each of the first light-modulating element 1 and the second light-modulating element 2.

The driving module DR drives the first light-modulating element 1 and the second light-modulating element 2. In other words, the driving module DR controls change of the transmission status of transmitting the light and the scattering status of scattering the light, in each of the first light-modulating element 1 and the second light-modulating element 2. For example, the driving module DR alternately performs a first mode of making the first light-modulating element scatter the light and making the second light-modulating element transmit the light and a second mode of making the first light-modulating element transmit the light and making the second light-modulating element scatter the light. These operations will be described below in more detail.

Figure 2:
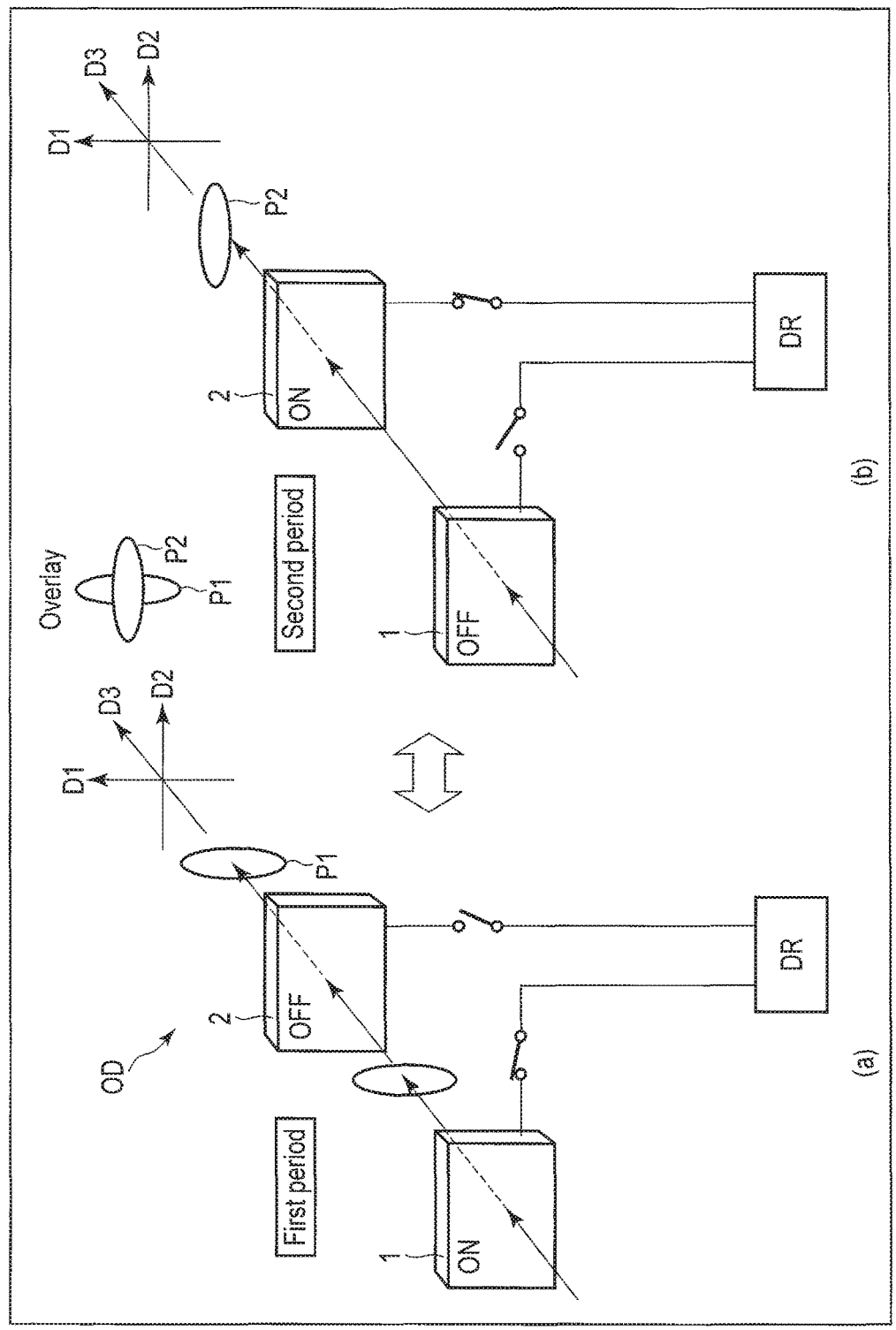
FIG. 2 is an illustration showing an example of an operation of the optical device OD shown in FIG. 1.

FIG. 2 is an illustration showing an example of an operation of the optical device OD shown in FIG. 1. In the embodiments, the light incident on the optical device OD is coherent light such as laser light. The light may be linearly polarized light having a plane of oscillation parallel to a direction in the D1-D2 plane or may be non-polarized light that has no particular plane of oscillation.

FIG. 2(a) illustrates the first mode of the driving module DR. The driving module DR makes the first light-modulating element 1 scatter the light in the first direction D1 and makes the second light-modulating element 2 transmit the light, in a first period. In the first mode, the light passing through the second light-modulating element 2 forms a scattering pattern P1 spreading in the first direction D1 as shown in FIG. 2(a).

FIG. 2(b) illustrates the second mode of the driving module DR. The driving module DR makes the first light-modulating element 1 transmit the light and makes the second light-modulating element 2 scatter the light in the second direction D2, in a second period following the first period. In the second mode, the light passing through the second light-modulating element 2 forms a scattering pattern P2 spreading in the second direction D2 as shown in FIG. 2(b). Either the first period or the second period may first start, and the first period may follow the second period. In addition, the first period and the second period may be equal periods or one of the periods may be longer than the other.

In the example shown in FIG. 2, the first light-modulating element 1 scatters the light in the first direction D1 when the first light-modulating element 1 is set in an operating status (on) by the driving module DR or transmits the light when the first light-modulating element 1 is set in an non-operating status (off) by the driving module DR. In addition, the second light-modulating element 2 scatters the light in the second direction D2 when the second light-modulating element 2 is set in the operating status (on) by the driving module DR or transmits the light when the second light-modulating element 2 is set in the non-operating status (off) by the driving module DR. Each of the first light-modulating element 1 and the second light-modulating element 2 may transmit the light in the operating status and scatter the light in the non-operating status.

The driving module DR alternately performs the first mode and the second mode. The light having passed through the optical device OD forms a pattern of overlaid scattering patterns P1 and P2 by changing the first mode and the second mode at the high frequency. The frequency for changing the first mode and the second mode may be so sufficiently high that flicker is inconspicuous for the display device, and may be, for example, 60 Hz, more desirably, approximately 120 Hz. Thus, the scattering pattern of the light having passed through the optical device OD changes spatially and temporally. The speckle of the coherent light can be therefore reduced.

A long-axis direction (first direction D1) of the scattering pattern P1 and a long-axis direction (second direction D2) of the scattering pattern P2 are desirably orthogonal to each other in the D1-D2 plane and may at least intersect each other.

In the present embodiments, each of the first light-modulating element 1 and the second light-modulating element 2 can be configured in any manner if the light-modulating element can implement the function of changing the transmission status and the scattering status. A light-modulating element 3 will be explained hereinafter as a configuration suitable for the first light-modulating element 1 and the second light-modulating element 2 of the present embodiments. The light-modulating element 3 explained hereinafter is configured by a liquid crystal device comprising polymer dispersed liquid crystal.

Figure 3:
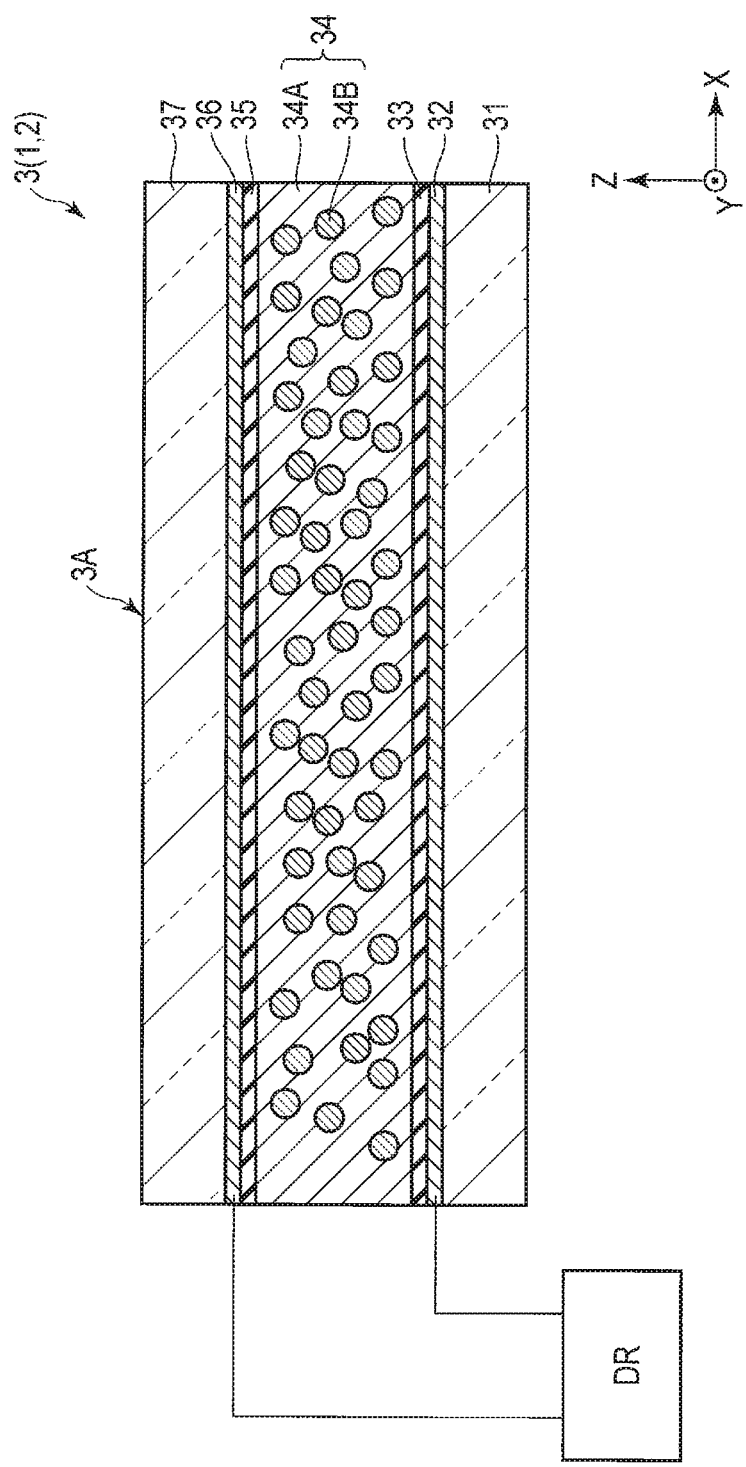
FIG. 3 is a cross-sectional view showing an example of a light-modulating element 3.

FIG. 3 is a cross-sectional view showing an example of the light-modulating element 3. In FIG. 3, the X direction, the Y direction and the Z direction are orthogonal to each other.

The light-modulating element 3 comprises a first substrate 31, a first electrode 32, a first alignment film 33, a light-modulating layer 34, a second alignment film 35, a second electrode 36, and a second substrate 37. For example, the light-modulating element 3 is shaped in a flat plate, and has a main surface 3A parallel to the X-Y plane defined by the X direction and the Y direction. The Z direction is parallel to the normal direction of the main surface 3A.

The first substrate 31 and the second substrate 37 are opposed to and spaced apart from each other. The first substrate 31 and the second substrate 37 are transparent for visible light and are formed of, for example, a glass plate or a plastic film.

Each of the first electrode 32 and the second electrode 36 is configured to be electrically connected with the driving module DR and to apply the electric field to the light-modulating layer 34. For example, the first electrode 32 is located on a side opposed to the light-modulating layer 34 of the first substrate 31, and the second electrode 36 is located on a side opposed to the light-modulating layer 34 of the second substrate 37. Both the first electrode 32 and the second electrode 36 may be located on any one of the first substrate and the second substrate. An example of the shape of the first electrode 32 and the second electrode 36 will be explained later. The first electrode 32 and the second electrode 36 are formed of, for example, a transparent conductive material such as indium tin oxide. The first electrode 32 and the second electrode 36 may be formed of an opaque metal material. In this case, an electrode installation area of the first electrode 32 and the second electrode 36 is desirably smaller than an area of a light transmitting portion (for example, an electrode gap or an electrode opening portion).

The first alignment film 33 and the second alignment film 35 are configured to align, for example, liquid crystal and polymer obtained by polymerizing the monomer used for the light-modulating layer 34. The first alignment film 33 is located between the first substrate 31 and the light-modulating layer 34, and the second alignment film 35 is located between the second substrate 37 and the light-modulating layer 34. Examples of the alignment films include, for example, a vertical alignment film and a horizontal alignment film. The first alignment film 33 and the second alignment film 35 may have a function of aligning the monomer in a predetermined direction when the monomer is polymerized. The monomer thereby becomes polymer polymerized in a status of aligning in a predetermined direction. In addition, the liquid crystal is aligned in a predetermined direction, depending on the aligning direction of the polymer. The first alignment film 33 and the second alignment film 35 may not be disposed since the liquid crystal and the monomer used for the light-modulating layer 34 can be aligned by even applying the electric field and the magnetic field between the first electrode 32 and the second electrode 36.

The light-modulating layer 34 is located between the first substrate 31 and the second substrate 37. The light-modulating layer 34 is a polymer dispersed liquid crystal layer, which includes a composite layer including a bulk 34A and fine particles 34B dispersed in the bulk 34A. The bulk 34A corresponds to the first region, which mainly contains a polymeric material (polymer) obtained by polymerizing a liquid crystal polymer. The fine particles 34B correspond to the second region, which mainly contains a liquid crystal material. The bulk 34A and the fine particles 34B have optical anisotropies, respectively.

The bulk 34A and the fine particles 34B have substantially equivalent refractive anisotropies, respectively. In other words, the bulk 34A and the fine particles 34B have substantially equivalent ordinary indexes and extraordinary indexes. For example, a deviation in the refractive index between the bulk 34A and the fine particles 34B caused by a manufacturing error and the like is permissible. For example, a difference in ordinary index between the bulk 34A and the fine particles 34B is desirably 0.1 or less and, more desirably 0.05 or less. In addition, a difference in extraordinary index between the bulk 34A and the fine particles 34B is, for example, desirably 0.1 or less and, more desirably 0.05 or less. A refractive index difference (=extraordinary index−ordinary index) of the bulk 34A or a refractive index difference (=extraordinary index−ordinary index) of the fine particles 34B is, for example, desirably 0.05 or more, more desirably 0.1 or more, and, much more desirably 0.15 or more.

In contrast, the bulk 34A and the fine particles 34B are different in response performance to electric field, and the response performance to electric field of the fine particles 34B is higher than the response performance to electric field of the bulk 34A. The bulk 34A has, for example, a streak-shaped structure or a porous structure which does not respond to the electric field or a rod-like structure having a response speed slower than the fine particles 34B.

A first configuration example of the light-modulating element 3 will be explained hereinafter with reference to FIG. 4 and FIG. 5. In the first configuration example, the first alignment film 33 and the second alignment film 35 are horizontal alignment films which align the monomer in an in-plane direction parallel to the X-Y plane, i.e., the horizontal direction, in a process of forming the polymer constituting the bulk 34A. In addition, the liquid crystal material constituting the fine particles 34B is a positive liquid crystal having a positive dielectric anisotropy.

FIG. 4 is an illustration schematically showing a status in which an electric field is not applied to the light-modulating layer 34 in the light-modulating element 3 of the first configuration example. This status corresponds to a status in which a voltage is not applied to the first electrode 32 and the second electrode 36 and also corresponds to the above-explained non-operating status (off).

In FIG. 4, ellipsoids 134A represent examples of refractive ellipsoids indicating the refractive anisotropy of the bulk 34A in the non-operating status. In FIG. 4, ellipsoids 134B represent examples of refractive ellipsoids indicating the refractive anisotropy of the fine particles 34B in the non-operating status. These refractive ellipsoids are tensor ellipsoids representing the refractive indexes of the linearly polarized light incident from various directions, and the refractive indexes can be geometrically understood by observing cross-sections of the ellipsoids from the direction in which the light is made incident.

In the non-operating status, an optical axis (more specifically, a major axis of the ellipsoid 134A) AX1 of the bulk 34A is parallel to an optical axis (more specifically, a major axis of the ellipsoid 134B) AX2 of the fine particles 34B. The optical axis AX1 corresponds to the first optical axis of the first region, and the optical axis AX2 corresponds to the second optical axis of the second region. The optical axes AX1 and AX2 indicate lines parallel to a direction of travel the light beam in which the refractive indexes indicate one value irrespective of the direction of polarization. In addition, the optical axes AX1 and AX2 in the non-operating status do not need to be completely parallel but may be slightly displaced due to, for example, an error in manufacturing and the like.

In the example shown in FIG. 4, the optical axes AX1 and AX2 are substantially parallel to the X-Y plane and are parallel to the alignment direction AD in the X-Y plane. The alignment direction AD is, for example, parallel to the Y direction. The alignment direction AD corresponds to the direction in which the liquid crystal polymer constituting the bulk 34A and the liquid crystal material constituting the fine particles 34B are aligned in the non-operating status. In addition, when the bulk 34A and the fine particles 34B are pretilted, the direction in which the optical axes AX1 and AX2 are orthogonally projected in the X-Y plane is the alignment direction AD.

As explained above, the bulk 34A and the fine particles 34B have substantially equal refractive anisotropies, and the shapes of the ellipsoids 134A and 134B indicating the respective refractive anisotropies are substantially the same. Furthermore, since the optical axes AX1 and AX2 are parallel to each other in the non-operating status, the refractive index difference is hardly made between the bulk 34A and the fine particles 34B in all the directions including the X direction, the Y direction and the Z direction. For this reason, the light incident from the first substrate 31 toward the second substrate 37 in the Z direction is transmitted without being scattered in the light-modulating layer 34, and emitted from the second substrate 37.

FIG. 5 is an illustration schematically showing a status in which an electric field is applied to the light-modulating layer 34 in the light-modulating element 3 of the first configuration example. This status corresponds to a status in which a voltage is applied to the first electrode 32 and the second electrode 36 and also corresponds to the above-explained operating status (on).

In FIG. 5, ellipsoids 134A represent examples of refractive ellipsoids indicating the refractive anisotropy of the bulk 34A in the operating status. In FIG. 5, ellipsoids 134B represent examples of refractive ellipsoids indicating the refractive anisotropy of the fine particles 34B in the operating status.

In the operating status, the alignment status of the liquid crystal material constituting the fine particles 34B is changed in accordance with the electric field. In the first configuration example in which the liquid crystal material has the positive dielectric anisotropy, the liquid crystal material is aligned such that the major axis is substantially parallel to the electric field formed in the light-modulating layer 34. In contrast, the alignment status of the polymeric material constituting the bulk 34A is not changed irrespective of the presence or absence of application of the electric field. In other words, the optical axis AX1 of the ellipsoid 134A indicating the refractive anisotropy of the bulk 34A is not changed irrespective of application of the electric field, and the optical axis AX2 of the ellipsoid 134B indicating the refractive anisotropy of the fine particles 34B is changed in accordance with the electric field.

In the operating status, the optical axis (i.e., the major axis of the ellipsoid 134A) AX1 of the bulk 34A intersects the optical axis (i.e., the major axis of the ellipsoid 134B) AX2 of the fine particles 34B. In the example shown in FIG. 5, the optical axis AX1 is substantially parallel to the X-Y plane and is parallel to the Y direction in the X-Y plane, similarly to the non-operating status. The optical axis AX2 is substantially parallel to the Z direction, unlike the non-operating status.

Since the optical axes AX1 and AX2 intersect each other in this operating status, a great refractive index difference is made between the bulk 34A and the fine particles 34B in all the directions including the X direction, the Y direction and the Z direction. For this reason, the light incident from the first substrate 31 toward the second substrate 37 in the Z direction is scattered in the light-modulating layer 34 and emitted from the second substrate 37. For example, a polarization component (P polarization) having a plane of oscillation in the Y direction, in the X-Y plane, of the light incident in the light-modulating layer 34, is mainly scattered.

Next, a second configuration example of the light-modulating element 3 will be explained hereinafter with reference to FIG. 6 and FIG. 7. The second configuration example is different from the first configuration example with respect to the first alignment film 63, the light-modulating layer 64 and the second alignment film 65. The first alignment film 63 and the second alignment film 65 are vertical alignment films which align the monomer in the vertical direction of the light-modulating element 3, i.e., the Z direction, in a process of forming the polymer constituting a bulk 64A. The light-modulating layer 64 includes a composite layer including the bulk 64A and fine particles 64B. The liquid crystal material constituting the fine particles 64B is a negative liquid crystal having a negative dielectric anisotropy.

Figure 6:
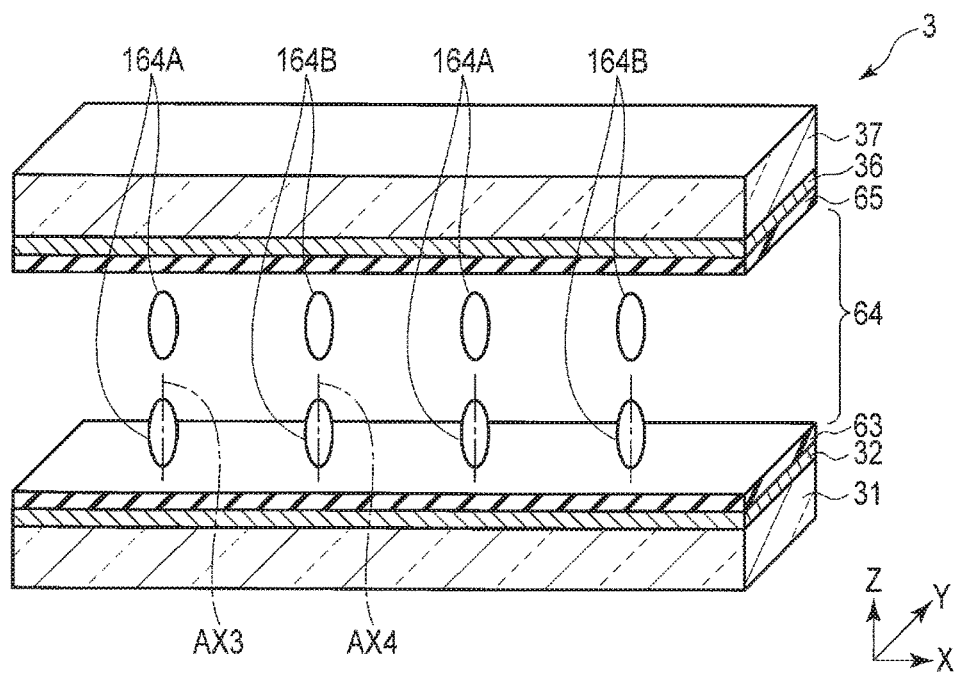
FIG. 6 is an illustration schematically showing a status in which an electric field is not applied to a light-modulating layer 64 in the light-modulating element 3 of a second configuration example.

FIG. 6 is an illustration schematically showing a status in which an electric field is not applied to a light-modulating layer 64 in the light-modulating element 3 of a second configuration example. This status corresponds to a status in which a voltage is not applied to the first electrode 32 and the second electrode 36 and also corresponds to the above-explained non-operating status (off).

In FIG. 6, ellipsoids 164A represent examples of refractive ellipsoids indicating the refractive anisotropy of the bulk 64A in the non-operating status. In FIG. 6, ellipsoids 164B represent examples of refractive ellipsoids indicating the refractive anisotropy of the fine particles 64B in the non-operating status.

In the non-operating status, an optical axis (i.e., a major axis of the ellipsoid 164A) AX3 of the bulk 64A is parallel to an optical axis (i.e., a major axis of the ellipsoid 164B) AX4 of the fine particles 64B. The optical axis AX3 corresponds to the first optical axis of the first region, and the optical axis AX4 corresponds to the second optical axis of the second region. The optical axes AX3 and AX4 in the non-operating status do not need to be completely parallel but may be slightly displaced due to, for example, an error in manufacturing and the like.

In the example shown in FIG. 6, the optical axes AX3 and AX4 are substantially parallel to the Z direction vertical to the X-Y plane. As explained above, the bulk 64A and the fine particles 64B have substantially equal refractive anisotropies, and the shapes of the ellipsoids 164A and 164B indicating the respective refractive anisotropies are substantially the same. Furthermore, since the optical axes AX1 and AX2 are parallel to each other in the non-operating status, the refractive index difference is hardly made between the bulk 64A and the fine particles 64B in all the directions including the X direction, the Y direction and the Z direction. For this reason, the light incident from the first substrate 31 toward the second substrate 37 in the Z direction is transmitted without being scattered in the light-modulating layer 34, and emitted from the second substrate 37.

Figure 7:
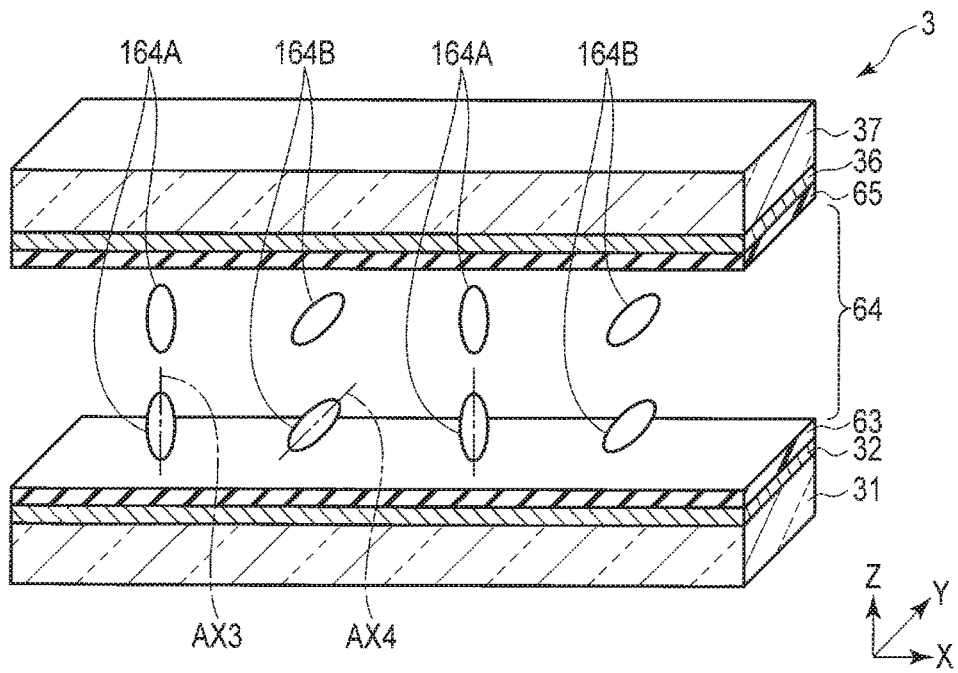
FIG. 7 is an illustration schematically showing a status in which an electric field is applied to the light-modulating layer 64 in the light-modulating element 3 of the second configuration example.

FIG. 7 is an illustration schematically showing a status in which an electric field is applied to the light-modulating layer 64 in the light-modulating element 3 of the second configuration example. This status corresponds to a status in which a voltage is applied to the first electrode 32 and the second electrode 36 and also corresponds to the above-explained operating status (on).

In FIG. 7, ellipsoids 164A represent examples of refractive ellipsoids indicating the refractive anisotropy of the bulk 64A in the operating status. In FIG. 7, ellipsoids 164B represent examples of refractive ellipsoids indicating the refractive anisotropy of the fine particles 64B in the operating status.

In the operating status, the alignment status of the liquid crystal material constituting the fine particles 64B is changed. In the second configuration example in which the liquid crystal material has the negative dielectric anisotropy, the liquid crystal material is aligned such that the major axis is substantially orthogonal to the electric field formed in the light-modulating layer 64. In contrast, the alignment status of the polymeric material constituting the bulk 64A is not changed irrespective of application of the electric field.

If the horizontal alignment film and the positive liquid crystal shown in FIG. 5 are applied, an orientation in which the liquid crystal rises due to application of the voltage is defined to be constant since pre-tilt of the liquid crystal is formed in the horizontal alignment film by the alignment processing such as rubbing. In contrast, if the vertical alignment film and the negative liquid crystal shown in FIG. 7 are applied, the orientation in which the liquid crystal lay down due to application of the voltage is preferably defined to be constant. As a manner of defining the orientation of lying down of the liquid crystal, manners, subjecting the vertical alignment film to alignment treatment such as rubbing, defining the orientation of lying down with the fringe field using the slit-shaped electrode, using the optical alignment film, and the like are desirably used. If the orientation of the aligned liquid crystal is not defined and the liquid crystal is angled in all orientations, the speckle correction effect of the present embodiment cannot be obtained. Furthermore, even when the polymer dispersed liquid crystal of the normally scattering type is used, the speckle correction effect cannot be obtained either since the alignment of the liquid crystal is at random in the non-voltage status.

In the operating status, the optical axis (i.e., the major axis of the ellipsoid 164A) AX3 of the bulk 64A intersects the optical axis (i.e., the major axis of the ellipsoid 164B) AX4 of the fine particles 64B. In the example shown in FIG. 7, the optical axis AX3 is substantially parallel to the Z direction, similarly to the non-operating status. The optical axis AX4 is substantially parallel to the X-Y plane and is parallel to the Y direction in the X-Y plane, unlike the non-operating status.

Since the optical axes AX3 and AX4 intersect each other in this operating status, a great refractive index difference is made between the bulk 64A and the fine particles 64B in all the directions including the X direction, the Y direction and the Z direction. For this reason, the light incident from the first substrate 31 toward the second substrate 37 in the Z direction is scattered in the light-modulating layer 64 and emitted from the second substrate 37. For example, the light incident on the light-modulating layer 64 is scattered irrespective of the direction of the plane of oscillation.

Next, configuration examples of the first electrode 32 and the second electrode 36 applicable to the light-modulating element 3 will be explained.

Figure 8C:
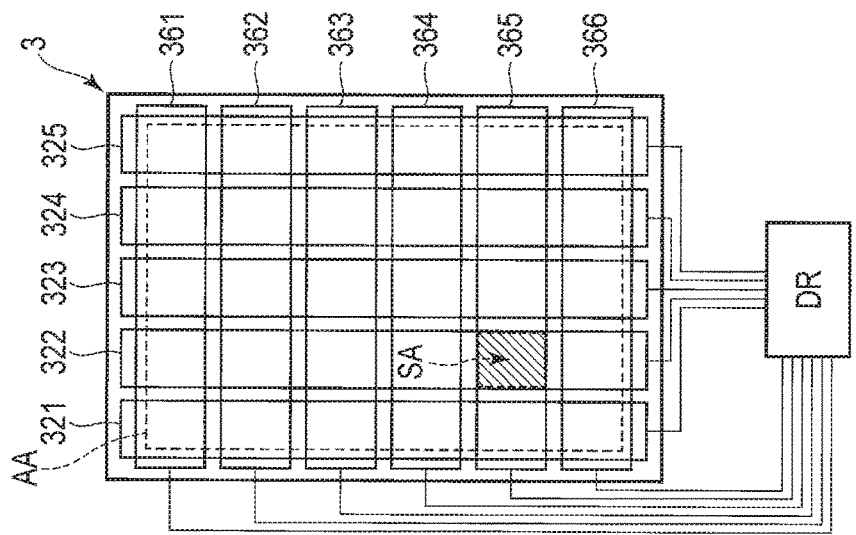
FIGS. 8A, 8B and 8C are plan views showing a configuration example of a first electrode 32 and a second electrode 36.
Figure 8B:
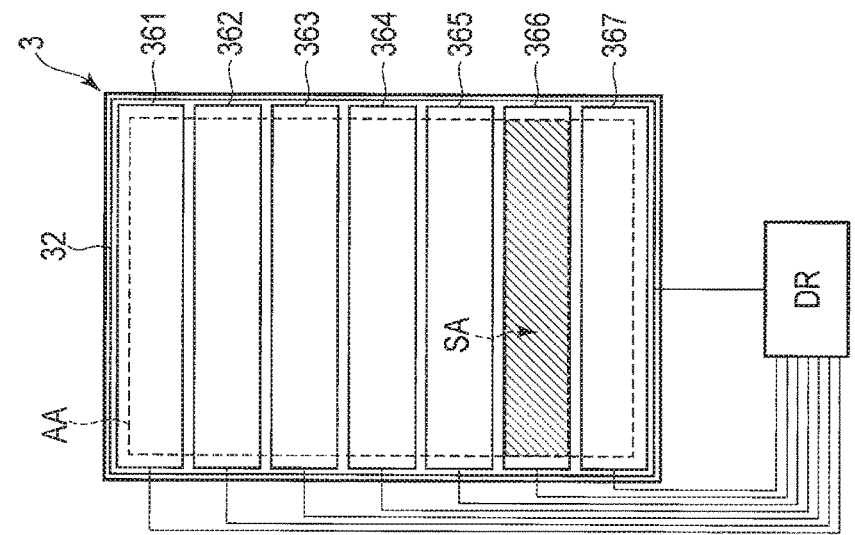
Figure 8A:
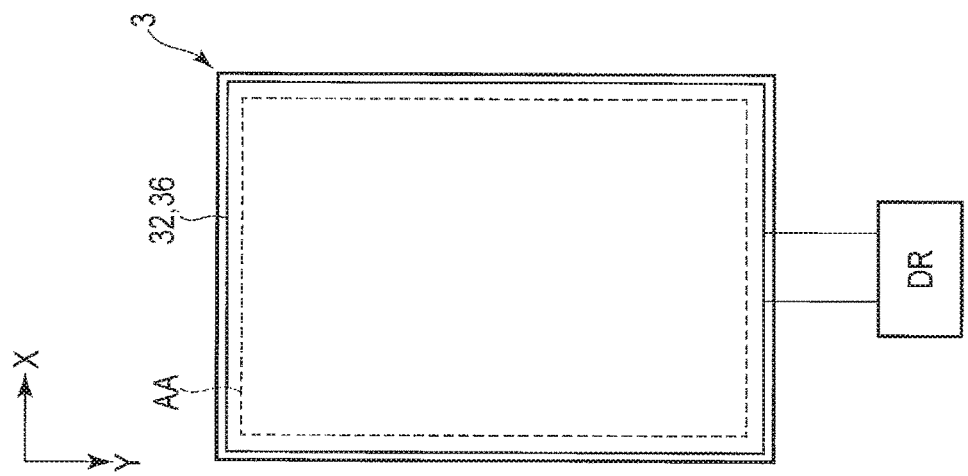

FIGS. 8A to 8C are plan views showing a configuration example of the first electrode 32 and the second electrode 36. The light-modulating element 3 includes an effective area AA from which the light is emitted, in the X-Y plane.

In the configuration example illustrated in FIG. 8A, each of the first electrode 32 and the second electrode 36 corresponds to a single sheet-shaped electrode extending over the entire surface of the effective area AA without cleavage. The driving module DR is electrically connected to each of the first electrode 32 and the second electrode 36. In this configuration example, the light-modulating element 3 can transmit or scatter the light on the entire surface of the effective area AA by controlling the voltage applied to the first electrode 32 and the second electrode 36 by the driving module DR.

The configuration example shown in FIG. 8B is different from the configuration example in FIG. 8A with respect to a feature that the effective area AA of the light-modulating element 3 includes strip-shaped sub-areas SA. The first electrode 32 corresponds to a single sheet-shaped electrode, similarly to the configuration example shown in FIG. 8A. The second electrode 36 corresponds to strip-shaped electrodes 361 to 367 spaced apart from each other. In the example shown in FIG. 8B, the strip-shaped electrodes 361 to 367 extend in the X direction and are arranged in the Y direction and spaced apart by gaps. The driving module DR is electrically connected to the first electrode 32 and each of the strip-shaped electrodes 361 to 367. Each of the sub-areas SA corresponds to an area in which the first electrode 32 and any one of the strip-shaped electrodes 361 to 367 are overlaid in the X-Y plane. In other words, in the example illustrated in FIG. 8B, each sub-area SA is a strip-shaped area extending in the X direction.

The strip-shaped electrodes 361 to 367 may extend in the Y direction and may be arranged in the X direction and spaced apart by gaps. In addition, the first electrode 32 may correspond to strip-shaped electrodes and the second electrode 36 may correspond to a single sheet-shaped electrode.

In this configuration example, the light-modulating element 3 can transmit or scatter the light in each of the sub-areas SA of the effective area AA by controlling the voltages applied to the strip-shaped electrodes 361 to 367 independently by the driving module DR. The light-modulating element 3 of this configuration example can also transmit or scatter the light on the entire surface of the effective area AA by controlling all the voltages applied to the strip-shaped electrodes 361 to 367 together.

The configuration example shown in FIG. 8C is different from the configuration example in FIG. 8A with respect to a feature that the effective area AA of the light-modulating element 3 includes the sub-areas SA arrayed in a matrix. The first electrode 32 corresponds to strip-shaped electrodes 321 to 325 spaced apart from each other. The second electrode 36 corresponds to strip-shaped electrodes 361 to 367 spaced apart from each other. In the example shown in FIG. 8C, the strip-shaped electrodes 321 to 325 extend in the Y direction and are arranged in the X direction and spaced apart by gaps. The strip-shaped electrodes 361 to 367 extend in the X direction and are arranged in the Y direction and spaced apart by gaps. The driving module DR is electrically connected to each of the strip-shaped electrodes 321 to 325 and each of the strip-shaped electrodes 361 to 367. Each of the sub-areas SA corresponds to an area in which any one of the strip-shaped electrodes 321 to 325 and any one of the strip-shaped electrodes 361 to 367 are overlaid in the X-Y plane. In other words, in the example illustrated in FIG. 8C, the sub-areas SA are arrayed in a matrix in the X direction and the Y direction.

In this configuration example, the light-modulating element 3 can transmit or scatter the light in each of the sub-areas SA of the effective area AA by controlling the voltages applied to the strip-shaped electrodes 321 to 325 and the strip-shaped electrodes 361 to 367 independently by the driving module DR. The light-modulating element 3 of this configuration example can also transmit or scatter the light on the entire surface of the effective area AA by controlling all the voltages applied to the strip-shaped electrodes 321 to 325 and the strip-shaped electrodes 361 to 367 together.

Next, an example of the optical device OD employing the light-modulating element 3 of the first configuration example as each of the first light-modulating element 1 and the second light-modulating element 2 will be explained.

Figure 9:
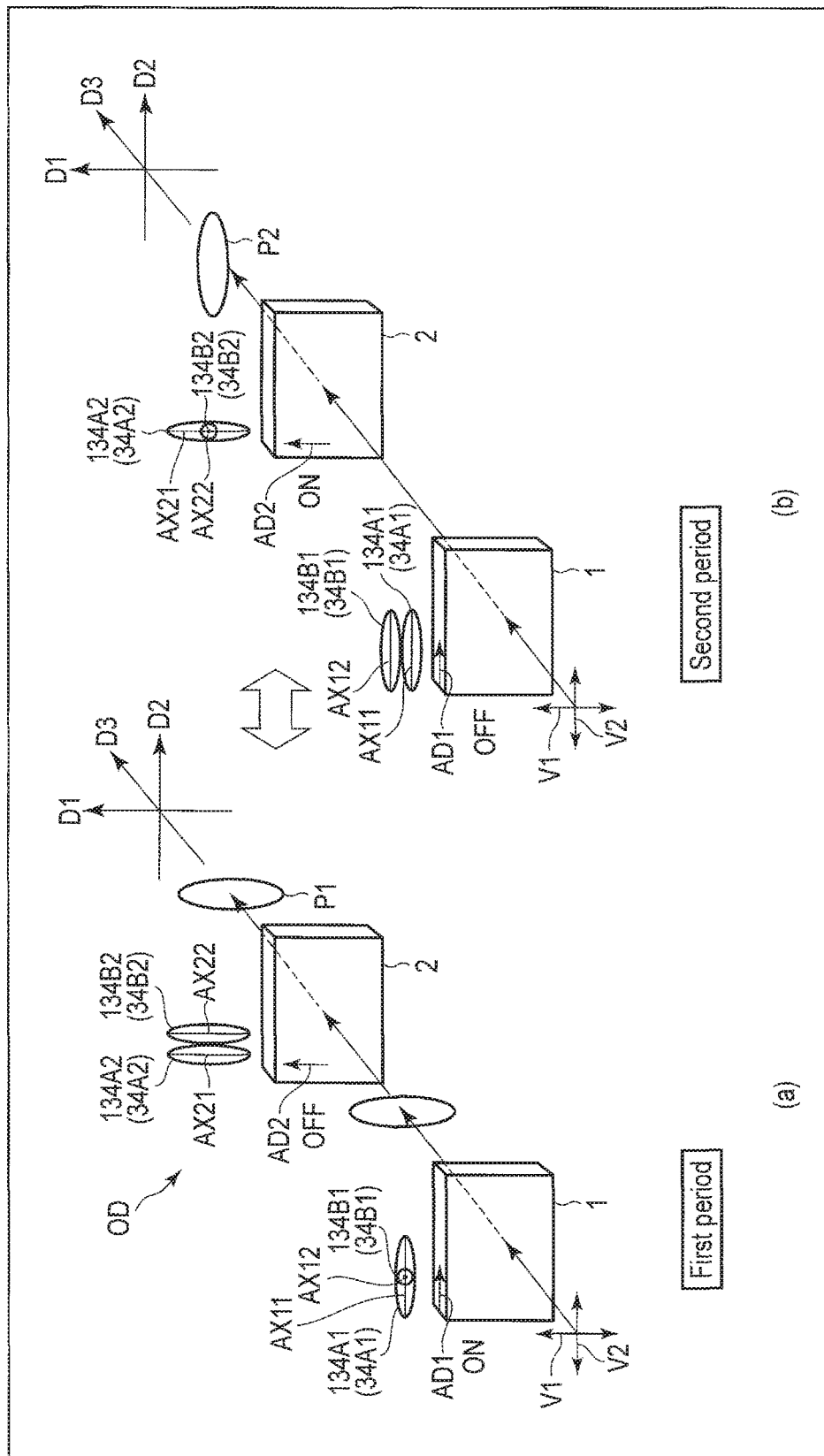
FIG. 9 is an illustration showing an example of the optical device OD.

FIG. 9 is an illustration showing an example of the optical device OD.

The first light-modulating element 1 has an alignment direction AD1 parallel to the second direction D2, and the second light-modulating element 2 has an alignment direction AD2 parallel to the first direction D1. In other words, each of an optical axis AX11 of a refractive ellipsoid 134A1 of a bulk 34A1 and an optical axis AX12 of a refractive ellipsoid 134B1 of fine particles 34B1, at the first light-modulating element 1, is parallel to the second direction D2, in an non-operating status (off) in which the electric field is not applied to the light-modulating layer (see FIG. 9(b)). In addition, each of an optical axis AX21 of a refractive ellipsoid 134A2 of a bulk 34A2 and an optical axis AX22 of a refractive ellipsoid 134B2 of fine particles 34B2, at the second light-modulating element 2, is parallel to the first direction D1, in an non-operating status (off) (see FIG. 9(a)). Thus, a refractive index difference is hardly made between the bulk and the fine particles in the non-operating status, at each of the first light-modulating element 1 and the second light-modulating element 2.

In contrast, in the operating status (on), the optical axis AX12 of the first light-modulating element 1 and the optical axis AX22 of the second light-modulating element 2 are changed, and the optical axis AX11 of the first light-modulating element 1 and the optical axis AX21 of the second light-modulating element 2 are not changed. In the example illustrated in of FIG. 9, the optical axis AX11 is parallel to the second direction D2, and the optical axis AX12 intersects the optical axis AX11 and is substantially parallel to the third direction D3, at the first light-modulating element 1. In addition, the optical axis AX21 is parallel to the first direction D1, and the optical axis AX22 intersects the optical axis AX21 and is substantially parallel to the third direction D3, at the second light-modulating element 2. Thus, a refractive index difference is made between the bulk and the fine particles in the operating status, at each of the first light-modulating element 1 and the second light-modulating element 2.

In a first mode of a first period shown in FIG. 9(a), the light incident on the optical device OD is scattered in the first direction D1, at the first light-modulating element 1 in the operating status. At this time, an oscillation component parallel to the alignment direction AD1, i.e., a polarization component V2 having a plane of oscillation in the second direction D2, of the light incident on the first light-modulating element 1, is mainly scattered for the reason that the refractive index difference is made between the bulk 34A1 and the fine particles 34B1, at the first light-modulating element 1. At the first light-modulating element 1, a polarization component V1 having a plane of oscillation in the first direction D1 is hardly scattered and is transmitted. The light scattered by the first light-modulating element 1 is then transmitted at the second light-modulating element 2 in the non-operating status. In the first mode, the light passing through the second light-modulating element 2 forms a scattering pattern P1 spreading in the first direction D1 as shown in FIG. 9(a).

In a second mode of the second period shown in FIG. 9(b), the light incident on the optical device OD is transmitted at the first light-modulating element 1 in the non-operating status, and then scattered in the second direction D2 at the second light-modulating element 2 in the operating status. At this time, an oscillation component parallel to the alignment direction AD2, i.e., a polarization component V1 having a plane of oscillation in the first direction D1, of the light incident on the second light-modulating element 2, is mainly scattered for the reason that the refractive index difference is made between the bulk 34A2 and the fine particles 34B2, at the second light-modulating element 2. In the second mode, the light passing through the second light-modulating element 2 forms a scattering pattern P2 spreading in the second direction D2 as shown in FIG. 9(b).

The first mode and the second mode are alternately performed, and the scattering pattern of the light having passed through the optical device OD thereby changes spatially and temporally. For this reason, the speckle can be reduced if the coherent light is made incident on the optical device OD.

In the example described, the light-modulating element 3 of the first configuration example is employed as each of the first light-modulating element 1 and the second light-modulating element 2, but the light-modulating element 3 of the second configuration example may be employed.

At the light-modulating elements 3 of the second configuration example, in the non-operating status, each of the optical axis AX3 of the refractive ellipsoid 164A of the bulk and the optical axis AX4 of the refractive ellipsoid 164B of the fine particles, is substantially parallel to the Z direction which corresponds to the normal direction of the light-modulating layer 64, as explained with reference to FIG. 6. In other words, the optical axes AX3 and AX4 of the first light-modulating element 1 and the second light-modulating element 2 are substantially parallel to the third direction D3 which corresponds to the normal direction of the light-modulating layers of the respective light-modulating elements, in the optical device OD employing the light-modulating element 3. For this reason, the light is transmitted through each of the light-modulating layers of the first light-modulating element 1 and the second light-modulating element 2 since a refractive index difference is hardly made between the bulk and the fine particles.

In contrast, at the light-modulating element 3 of the second configuration example, in the operating status, the optical axis AX3 is substantially parallel to the Z direction, and the optical axis AX4 is substantially parallel to the Y direction, as explained with reference to FIG. 7. Thus, a refractive index difference is hardly made between the bulk and the fine particles and the light is scattered, at the light-modulating layer of the third light-modulating element 3.

The optical device OD employing the third light-modulating elements 3 is configured such that the optical axes AX4 of the first light-modulating element 1 and the second light-modulating element 2 intersect (or are desirably orthogonal to) each other in the D1-D2 plane. For example, the first light-modulating element 1 is configured such that the optical axis of the fine particles in the operating status is substantially parallel to the second direction D2, and the second light-modulating element 2 is configured such that the optical axis of the fine particles is substantially parallel to the first direction D1. Thus, a refractive index difference is made between the bulk and the fine particles, and the incident light is scattered in the first direction D1, at the light-modulating layer of the first light-modulating element 1. In addition, a refractive index difference is also made between the bulk and the fine particles, and the incident light is scattered in the second direction D2, at the light-modulating layer of the second light-modulating element 2.

FIG. 10 is an illustration showing another example of the optical device OD.

The optical device OD shown in FIG. 10 is different from the optical device OD shown in FIG. 9 with respect to a feature of comprising a retardation plate 4 located between the first light-modulating element 1 and the second light-modulating element 2. The retardation plate 4 comprises a function of rotating the polarization plane for the light emitted from the first light-modulating element 1 at ninety degrees. For example, the retardation plate 4 is a half-wave plate which imparts a λ/2 phase difference between ordinary rays and extraordinary rays where the wavelength of the light passing through the retardation film is represented by λ. The other constituent elements are not explained in detail here since they are the same as those of the example shown in FIG. 9. It should be noted that the light incident on the optical device OD is the linearly polarized light mainly including an oscillation component V2 parallel to the second direction D2.

In a first mode of a first period shown in FIG. 10(a), the linearly polarized light incident on the optical device OD is scattered in the first direction D1, at the first light-modulating element 1 in the operating status. The linearly polarized light scattered by the first light-modulating element 1 has the plane of polarization rotated at ninety degrees and is converted into linearly polarized light mainly including an oscillation component V1 parallel to the first direction D1, when the linearly polarized light passes through the retardation plate 4. After that, the linearly polarized light is transmitted through the second light-modulating element 2 in the non-operating status. In the first mode, the linearly polarized light transmitted through the second light-modulating element 2 mainly includes the oscillation component V1 and forms a scattering pattern P1 spreading in the first direction D1 as shown in FIG. 10(a).

In a second mode of a second period shown in FIG. 10(b), the linearly polarized light incident on the optical device OD is transmitted through the first light-modulating element 1 in the non-operating status, and has the plane of polarization rotated at ninety degrees and is converted into linearly polarized light mainly including an oscillation component V1 parallel to the first direction D1, when passing through the retardation plate 4. After that, the linearly polarized light is scattered in the second direction D2, at the second light-modulating element 2 in the operating status. In the second mode, the light having passed through the second light-modulating element 2 mainly includes the oscillation component V1, similarly to the first mode, and forms the scattering pattern P2 spreading in the second direction D2 as shown in FIG. 10(b).

The first mode and the second mode are alternately performed, and the scattering pattern of the linearly polarized light thereby changes spatially, in time while constantly maintaining the polarization plane of the linearly polarized light which has passed through the optical device OD. For this reason, even if the coherent light such as polarized laser light is made incident on the optical device OD, the speckle can be reduced while maintaining the polarization plane. The optical device OD is suitable for an electronic device such as a liquid crystal display device using the linearly polarized light.

In the optical device OD shown in FIG. 10, too, the light-modulating element 3 of the second configuration example may be employed as each of the first light-modulating element 1 and the second light-modulating element 2, though not described in detail.

Next, a lighting unit 10 comprising the optical device OD of the present embodiment will be explained.

FIG. 11 is a perspective view showing a configuration example of the lighting unit 10.

The lighting unit 10 comprises a light source 11, an optical magnification system 12, and the above-described optical device OD. For example, the light source 11, the optical magnification optical system 12, and the optical device OD are aligned in this order in the direction of travel of light. The optical device OD may be located between the light source 11 and the optical magnification system 12. Interest of illumination I is illuminated by the light emitted from the optical device OD. The interest of illumination I is, for example, a display panel of various types such as a liquid crystal display panel holding a liquid crystal layer between a pair of substrates, a self-luminous display panel comprising an organic electroluminescent element and the like, an electronic paper display panel comprising a cataphoretic element and the like, a display panel employing microelectromechanical systems, or a display panel employing electrochromism, but may be the other medium.

The light source 11 is, for example, a laser light source which emits laser light. The laser light source may be any one of a semiconductor laser light source, a solid laser light source, a liquid laser light source, a gas laser light source and the like and may further comprise a wavelength conversion element.

The optical magnification system 12 comprises, for example, a diffractive optical element. The optical magnification system 12 has a function of diffracting the laser light emitted from the light source 11, magnifying laser light in accordance with the shape of the interest of illumination I and forming a shape of the beam spot of the laser light. For example, a computer-generated hologram can be employed as the diffractive optical element.

The configuration of the optical device OD has been explained above, and includes the first light-modulating element 1, the second light-modulating element 2, and the like aligned in the direction of travel of the light as shown in FIG. 9, FIG. 10, and the like.

According to the lighting unit 10, the interest of illumination I can be illuminated by the illumination light in which an influence from the speckle is reduced.

Next, a display panel, which is an example of the interest of illumination I, will be explained.

FIG. 12 is a cross-sectional view showing a configuration example of the display panel PNL. A liquid crystal display panel will be explained here as an example of the display device PNL.

The display panel PNL comprises a first substrate SUB1, a second substrate SUB2, a liquid crystal layer LC, a first polarizer PL1, and a second polarizer PL2. The first substrate SUB1 and the second substrate SUB2 are bonded to each other by a sealing member SE. The liquid crystal layer LC is held between the first substrate SUB1 and the second substrate SUB2. The first polarizer PL1 is located on a side opposite to the side of the first substrate SUB1 opposed to the liquid crystal layer LC. The second polarizer PL2 is located on a side opposite to the side of the second substrate SUB2 opposed to the liquid crystal layer LC.

FIG. 13 is an illustration showing a configuration example of the display panel PNL shown in FIG. 12.

The display panel PNL includes a display area DA where an image is displayed. The display area DA includes pixels PX arrayed in a matrix. The first substrate SUB1 includes gate lines G (also called scanning lines), and source lines S (also called data lines or signal lines) intersecting the gate lines G. Each of the gate lines G is led to the outside of the display area DA and is connected to a gate driver GD. Each of the source lines S is led to the outside of the display area DA and is connected to a source driver SD. The gate driver GD and the source driver SD are connected to a controller CNT. The controller CNT controls the gate driver GD and the source driver SD, based on data of the image displayed in the display area DA.

Each of the pixels PX comprises a switching element SW (for example, a thin-film transistor), a pixel electrode PE, a common electrode CE, and the like. The switching element SW is electrically connected to the gate line G and the source line S. The pixel electrode PE is electrically connected to the switching element SW. The common electrode CE is opposed to each of the pixel electrodes PE. Details of the configuration of the display panel PNL are not explained here but, in a mode of primarily utilizing a longitudinal electric field along a normal direction of the display panel PNL, the common electrode CE is disposed on the second substrate SUB2 while the pixel electrode PE is disposed on the first substrate SUB1. In addition, in a mode of primarily utilizing a lateral electric field along the in-plane of the display panel PNL, both the pixel electrode PE and the common electrode CE are disposed on the first substrate SUB1.

The mode of utilizing the longitudinal electric field is, for example, a twisted nematic (TN) mode, a polymer dispersed liquid crystal (PDLC) mode, an optically compensated bend (OCB) mode, an electrically controlled birefringence (ECB) mode, or a vertical aligned (VA) mode. In addition, the mode of utilizing the lateral electric field is, for example, a fringe field switching (FFS) mode, an in-plane switching (IPS) mode or the like.

The display panel PNL may be a transmissive display panel which displays an image by allowing the light from the lighting unit 10 to be selectively transmitted, a reflective display panel which displays an image by allowing external light or the light from the lighting unit 10 to be selectively transmitted, or a transflective display panel having display functions of both the transmissive display panel and the reflective display panel.

The display device capable of reducing an influence from speckle and keeping preferable display quality can be configured by employing the display panel PNL as the interest of illumination I shown in FIG. 11.

The lighting unit 10 can be employed as what is called a backlight unit, which illuminates a transmissive display panel PNL from its back surface side, and can also be employed as what is called a front light unit, which illuminates a reflective display panel PNL from its front surface (or display surface) side.

Next, a configuration example of the display device will be explained.

FIG. 14 is an illustration showing a first configuration example of a display device 100.

The display device 100 of the first configuration example is what is called a front projector, which supplies light to a screen 23 provided on an observer side and allows the light reflected on the screen 23 to be observed to appreciate an image. The display device 100 comprises lighting units 10B, 10G and 10R, display panels PNLB, PNLG and PNLR, an optical synthesizing system 21, an optical projection system 22 and the like.

The lighting units 10B, 10G and 10R are configured similarly to the lighting unit 10 explained with reference to FIG. 11. The lighting unit 10B corresponds to a first lighting unit which emits light (B) of a blue-color wavelength, and comprises a light source 11B, an optical magnification system 12B, and an optical device ODB. The lighting unit 10G corresponds to a second lighting unit which emits light (G) of a green-color wavelength, and comprises a light source 11G, an optical magnification system 12G, and an optical device ODG. The lighting unit 10R corresponds to a third lighting unit which emits light (R) of a red-color wavelength, and comprises a light source 11R, an optical magnification system 12R, and an optical device ODR.

The light source 11B emits blue light. The light source 11G emits green light. The light source 11R emits red light. For example, laser light sources can be employed as the light sources 11B, 11G and 11R. The optical magnification systems 12B, 12G and 12R are configured to properly magnify laser light of the respective wavelengths and to form its beam spot. Each of the optical devices ODB, ODG, and ODR comprises the first light-modulating element 1, the second light-modulating element 2, and the like aligned in the direction of travel of the light as shown in FIG. 9, FIG. 10, and the like.

The display panels PNLB, PNLG, and PNLR are configured similarly to the display panel PNL explained with reference to FIG. 12 and FIG. 13. The display panel PNLB corresponds to a first display panel illuminated by the lighting unit 10B. The display panel PNLG corresponds to a second display panel illuminated by the lighting unit 10G. The display panel PNLR corresponds to a third display panel illuminated by the lighting unit 10R.

The optical synthesizing system 21 is configured to synthesize a first image displayed on the display panel PNLB, a second image displayed on the display panel PNLG, and a third image displayed on the display panel PNLR. For example, the optical synthesizing system 21 corresponds to a cross dichroic prism, and has two reflective surfaces 21a and 21b disposed to be substantially orthogonal to each other. The reflective surface 21a reflects the red light forming the third image toward the optical projection system 22 and transmits the blue light forming the first image and the green light forming the second image. The reflective surface 21b reflects the blue light forming the first image toward the optical projection system 22 and transmits the green light forming the second image and the red light forming the third image. The green light forming the second image is transmitted through the optical synthesizing system 21 toward the optical projection system 22. The optical synthesizing system 21 synthesizes the first to third images.

The optical projection system 22 is located between optical synthesizing system 21 and the screen 23 and configured to magnify and project the image synthesized by the optical synthesizing system 21 onto the screen 23.

According to the display device 100 of the first configuration example, an influence from speckle can be reduced at each of the lighting units 10B, 10G, and 10R. For this reason, preferable display quality can be obtained by illuminating the display panels PNLB, PNLG and PNLR with the illumination light from the lighting units.

FIG. 15 is an illustration showing a second configuration example of the display device 100.

The display device 100 of the second configuration example is different from the display device 100 of the first configuration example with respect to a feature that each of the lighting units 10B, 10G and 10R does not comprise the optical device OD, but the screen is configured by the optical device OD. The optical device OD comprises the first light-modulating element 1 and the second light-modulating element 2 arranged in the direction of travel of the light.

According to the display device 100 of the second configuration example, an influence from speckle can be reduced at the optical device OD which functions as a screen. For this reason, preferable display quality can be obtained by observing the light scattered by the optical device OD.

FIG. 16 is an illustration showing a third configuration example of the display device 100.

The display device 100 of the third configuration example is what is called a rear projector, which projects the light to one of surfaces of the optical device OD constituting the screen and allows the light emitted from the other surface of the optical device OD to be observed to appreciate an image.

The display device 100 comprises an optical engine unit 40 and a mirror 50 besides the optical device OD. The optical engine unit 40 is accommodated in a housing 60. The mirror 50 is disposed on a back surface portion of the housing 60. The optical device OD corresponding to the screen is disposed at a position facing the observer side, in the housing 60.

The optical engine unit 40 includes the lighting units 10B, 10G and 10R, the display panels PNLB, PNLG and PNLR, the optical synthesizing system 21, an optical projection system 22 and the like, as represented by, for example, a dotted line in FIG. 15. In the optical engine unit 40, the optical projection system projects the magnified image toward the mirror 50. The mirror 50 reflects the projected image toward the optical device OD.

According to the display device 100 of the third configuration example, an influence from speckle can be reduced at the optical device OD which functions as a screen. For this reason, preferable display quality can be obtained by observing the light scattered by the optical device OD.

FIG. 17 is an illustration showing a fourth configuration example of the display device 100.

The display device 100 of the fourth configuration example comprises the lighting unit 10 and the display panel PNL. The display panel PNL is a transmissive liquid crystal display panel configured similarly to the display panel explained with reference to FIG. 12. The lighting unit 10 is located on a side of the display panel PNL which is opposed to the first substrate SUB1, and configured as a backlight unit. The lighting unit 10 comprises the light source 11, a light guide LG, a reflector plate RP, and the optical device OD. For example, the optical device OD is located between the light source 11 and the light guide LG. The first light-modulating element 1 and the second light-modulating element 2 of the optical device OD are aligned in the direction of travel of light. In other words, the first light-modulating element 1 is located on a side close to the light source 11, and the second light-modulating element 2 is located on a side close to the light guide LG. The reflector plate RP is located on a side opposite to a side of the light guide LG which is opposed to the display panel PNL.

The light emitted from the light source 11 of the lighting unit 10 is scattered spatially in time in the optical device OD and made incident on the light guide LG. The light incident on the light guide LG is made incident directly on the display panel PNL or reflected on the reflector plate RP and made incident on the display panel PNL. The light incident on the display panel PNL is selectively transmitted. The image is thereby displayed.

According to the display device 100 of the fourth configuration example, an influence from speckle can be reduced at the lighting unit 10. For this reason, preferable display quality can be obtained by illuminating the display panel PNL with the illumination light from the lighting unit 10.

FIG. 18 is an illustration showing a fifth configuration example of the display device 100.

The display device 100 of the fifth configuration example is different from the display device 100 of the fourth configuration example with respect to a feature that the optical device OD is located between light guide LG and the display panel PNL. The first light-modulating element 1 and the second light-modulating element 2 of the optical device OD are aligned in the direction of travel of light. In other words, the first light-modulating element 1 is located on a side close to the light guide LG, and the second light-modulating element 2 is located on a side close to the display panel PNL.

The light emitted from the light source 11 of the lighting unit 10 is made incident on the light guide LG. The light incident on the light guide LG is made incident directly on the optical device OD or reflected on the reflector plate RP and made incident on the optical device RP. The light incident on the optical device OD is scattered spatially in time and made incident on the display panel PNL. The light incident on the display panel PNL is selectively transmitted. The image is thereby displayed.

In the display device 100 of the fifth configuration example, too, the same advantage as that of the fourth configuration example can be obtained.

According to the embodiments, as described above, the optical device and the display device capable of reducing speckle can be provided.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. For example, the some structural elements may be deleted from the whole structural elements indicated in the above-described embodiments. Furthermore, some structural elements of one embodiment may be combined with other structural elements of another embodiment.

Examples of the display device which can be obtained from the configurations described in the present specification will be hereinafter explained.

(1)

An optical device comprising:

a first light-modulating element transmitting or scattering light;

a second light-modulating element transmitting or scattering the light passing through the first light-modulating element; and a driving module driving the first light-modulating element and the second light-modulating element, wherein, a scattering direction of the first light-modulating element is a first direction, a scattering direction of the second light-modulating element is a second direction intersecting the first direction, the driving module alternately performs a first mode of making the first light-modulating element scatter the light and making the second light-modulating element transmit the light, and a second mode of making the first light-modulating element transmit the light and making the second light-modulating element scatter the light.

(2)

The optical device according to (1), wherein each of the first light-modulating element and the second light-modulating element comprises a first substrate and a second substrate opposed to each other, a light-modulating layer located between the first substrate and the second substrate, and a first electrode and a second electrode electrically connected to the driving module to apply electric fields to the light-modulating layer, the light-modulating layer includes a first area and a second area each having an optical anisotropy, the first area contains a polymeric material, and the second area contains a liquid crystal material.

(3)

The optical device according to (2), wherein a first optical axis of the first area is unchanged irrespective of application of the electric fields, a second optical axis of the second area is changed in accordance with the electric fields, and the first optical axis and the second optical axis are parallel to each other in a status in which the electric fields are not applied, and intersect each other in a status in which the electric fields are applied.

(4)

The optical device according to (3), wherein the liquid crystal material has a positive dielectric anisotropy, and the first optical axis and the second optical axis are parallel to a plane defined by the first direction and the second direction in a status in which the electric fields are not applied.

(5)

The optical device according to (3), wherein the liquid crystal material has a negative dielectric anisotropy, and the first optical axis and the second optical axis are vertical to a plane defined by the first direction and the second direction in a status in which the electric fields are not applied.

(6)

The optical device according to (3), wherein in the first light-modulating element, the first optical axis and the second optical axis are parallel to the second direction in a status in which the electric field is not applied, and the first optical axis is parallel to the second direction and the second optical axis intersects the first optical axis in a status in which the electric field is applied, and in the second light-modulating element, the first optical axis and the second optical axis are parallel to the first direction in a status in which the electric field is not applied, and the first optical axis is parallel to the first direction and the second optical axis intersects the first optical axis in a status in which the electric field is applied.

(7)

The optical device according to any one of (1) to (6), wherein each of the first light-modulating element and the second light-modulating element includes an effective area through which the light passes, each of the first light-modulating element and the second light-modulating element transmits or scatters the light on an entire surface of the effective area.

(8)

The optical device according to any one of (1) to (6), wherein each of the first light-modulating element and the second light-modulating element includes an effective area through which the light passes, each of the first light-modulating element and the second light-modulating element includes sub-areas in the effective area, and each of the first light-modulating element and the second light-modulating element transmits or scatters the light in each of the sub-areas.

(9)

The optical device according to any one of (1) to (8), further comprising:

a retardation plate located between the first light-modulating element and the second light-modulating element, wherein the retardation plate rotates a plane of polarization of the light passing through the first light-modulating element at ninety degrees.

(10)

The optical device according to any one of (1) to (9), further comprising:

a light source emitting laser light.

(11)

A display device comprising:

the optical device of any one of (1) to (10); and a display panel illuminated by the light emitted from the optical device.

(12)

An optical device comprising:

a first light-modulating element; and a second light-modulating element wherein a light passing through the first light-modulating element is incident to the second light-modulating element, each of the first light-modulating element and the second light-modulating element changes a transmitting mode of transmitting the light incident thereon and a scattering mode of scattering the light incident thereon, a scattering direction of the first light-modulating element is different from a scattering direction of the second light-modulating element, timing of setting the first light-modulating element to the scattering mode is different from timing of setting the second light-modulating element to the scattering mode.

(13)

The optical device according to (12), wherein the second light-modulating element scatters the light transmitted in the first light-modulating element, and transmits the light scattered in the first light-modulating element.

(14)

The optical device according to (13), wherein the first light-modulating element includes a first main surface, and the second light-modulating element includes a second main surface, a scattering direction of the first light-modulating element is a first direction in the first main surface, a scattering direction of the second light-modulating element is a second direction in the second main surface, and the first direction and the second direction intersect each other.

(15)

The optical device according to (14), wherein the first main surface and the second main surface are parallel and are arranged with a third direction intersecting the first direction and the second direction.

(16)

The optical device according to (14), wherein the first light-modulating element and the second light-modulating element are shaped in a flat plate, and the first light-modulating element and the second light-modulating element are arranged with a third direction intersecting the first direction and the second direction.

(17)

The optical device according to (12), wherein each of the first light-modulating element and the second light-modulating element includes a liquid crystal device which comprises a polymer dispersing liquid crystal layer, and a first electrode and a second electrode which apply voltages to the polymer dispersing liquid crystal layer.

(18)

The optical device according to (17), wherein each of the first light-modulating element and the second light-modulating element further comprises a horizontal alignment film, and the polymer dispersing liquid crystal layer contains a liquid crystal material having a positive dielectric anisotropy.

(19)

The optical device according to (17), wherein each of the first light-modulating element and the second light-modulating element further comprises a vertical alignment film, and the polymer dispersing liquid crystal layer contains a liquid crystal material having a negative dielectric anisotropy.

(20)

The optical device according to (12), further comprising:

a half-wave plate between the first light-modulating element and the second light-modulating element.

(21)

A display device, comprising:

a first lighting unit emitting light of a first wavelength;

a second lighting unit emitting light of a second wavelength longer than the first wavelength;

a third lighting unit emitting light of a third wavelength longer than the second wavelength;

a first display panel illuminated by the first lighting unit;

a second display panel illuminated by the second lighting unit;

a third display panel illuminated by the third lighting unit; and an optical synthesizing system synthesizing a first image displayed on the first display panel, a second image displayed on the second display panel, and a third image displayed on the third display panel, the first lighting unit, the second lighting unit and the third lighting unit each comprising:

a first light-modulating element transmitting or scattering the light;

a second light-modulating element transmitting or scattering the light passing through the first light-modulating element; and a driving module driving the first light-modulating element and the second light-modulating element, wherein, a scattering direction of the first light-modulating element is a first direction, a scattering direction of the second light-modulating element is a second direction different from the first direction, the driving module alternately performs a first mode of making the first light-modulating element scatter the light and making the second light-modulating element transmit the light, and a second mode of making the first light-modulating element transmit the light and making the second light-modulating element scatter the light.

(22)

A display device, comprising:

a screen;

a display panel displaying an image; and an optical projection system located between the display panel and the screen to magnify and project the image displayed on the display panel to the screen, wherein, the screen includes a first light-modulating element, a second light-modulating element arranged in a direction of travel of light, and a driving module driving the first light-modulating element and the second light-modulating element, each of the first light-modulating element and the second light-modulating element transmits or scatters the light, a scattering direction of the first light-modulating element is a first direction, a scattering direction of the second light-modulating element is a second direction intersecting the first direction, the driving module alternately performs a first mode of making the first light-modulating element scatter the light and making the second light-modulating element transmit the light, and a second mode of making the first light-modulating element transmit the light and making the second light-modulating element scatter the light.

(23)

A display device, comprising:

a light source;

a light guide guiding light emitted from the light source;

a display panel illuminated by the light emitted from the light guide;

a first light-modulating element and a second light-modulating element located between the light source and the light guide or between the light guide and the display panel, and arranged in a direction of travel of light; and a driving module driving the first light-modulating element and the second light-modulating element, wherein, each of the first light-modulating element and the second light-modulating element transmits or scatters the light,
a scattering direction of the first light-modulating element is a first direction,
a scattering direction of the second light-modulating element is a second direction intersecting the first direction,
the driving module alternately performs a first mode of making the first light-modulating element scatter the light and making the second light-modulating element transmit the light, and a second mode of making the first light-modulating element transmit the light and making the second light-modulating element scatter the light.

What is claimed is:

1. An optical device, comprising:
a first light-modulating element transmitting or scattering light;
a second light-modulating element transmitting or scattering the light passing through the first light-modulating element; and
a driving module driving the first light-modulating element and the second light-modulating element, wherein,
a scattering direction of the first light-modulating element is a first direction,
a scattering direction of the second light-modulating element is a second direction intersecting the first direction,
the driving module alternately performs a first mode of making the first light-modulating element scatter the light and making the second light-modulating element transmit the light, and a second mode of making the first light-modulating element transmit the light and making the second light-modulating element scatter the light.

2. The optical device according to claim 1, wherein
each of the first light-modulating element and the second light-modulating element comprises a first substrate and a second substrate opposed to each other, a light-modulating layer located between the first substrate and the second substrate, and a first electrode and a second electrode electrically connected to the driving module to apply electric fields to the light-modulating layer,
the light-modulating layer includes a first area and a second area each having an optical anisotropy,
the first area contains a polymeric material, and
the second area contains a liquid crystal material.

3. The optical device according to claim 2, wherein
a first optical axis of the first area is unchanged irrespective of application of the electric fields,
a second optical axis of the second area is changed in accordance with the electric fields, and
the first optical axis and the second optical axis are parallel to each other in a status in which the electric fields are not applied, and intersect each other in a status in which the electric fields are applied.

4. The optical device according to claim 3, wherein
the liquid crystal material has a positive dielectric anisotropy, and
the first optical axis and the second optical axis are parallel to a plane defined by the first direction and the second direction in a status in which the electric fields are not applied.

5. The optical device according to claim 3, wherein
the liquid crystal material has a negative dielectric anisotropy, and
the first optical axis and the second optical axis are vertical to a plane defined by the first direction and the second direction in a status in which the electric fields are not applied.

6. The optical device according to claim 3, wherein
in the first light-modulating element, the first optical axis and the second optical axis are parallel to the second direction in a status in which the electric field is not applied, and the first optical axis is parallel to the second direction and the second optical axis intersects the first optical axis in a status in which the electric field is applied, and
in the second light-modulating element, the first optical axis and the second optical axis are parallel to the first direction in a status in which the electric field is not applied, and the first optical axis is parallel to the first direction and the second optical axis intersects the first optical axis in a status in which the electric field is applied.

7. The optical device according to claim 1, wherein
each of the first light-modulating element and the second light-modulating element includes an effective area through which the light passes,
each of the first light-modulating element and the second light-modulating element transmits or scatters the light on an entire surface of the effective area.

8. The optical device according to claim 1, wherein
each of the first light-modulating element and the second light-modulating element includes an effective area through which the light passes,
each of the first light-modulating element and the second light-modulating element includes sub-areas in the effective area, and
each of the first light-modulating element and the second light-modulating element transmits or scatters the light in each of the sub-areas.

9. The optical device according to claim 1, further comprising:
a retardation plate located between the first light-modulating element and the second light-modulating element,
wherein the retardation plate rotates a plane of polarization of the light passing through the first light-modulating element at ninety degrees.

10. The optical device according to claim 1, further comprising:
a light source emitting laser light.

11. A display device comprising:
the optical device of claim 1; and
a display panel illuminated by the light emitted from the optical device.

12. An optical device comprising:
a first light-modulating element; and
a second light-modulating element, wherein
a light passing through the first light-modulating element is incident to the second light-modulating element,
each of the first light-modulating element and the second light-modulating element changes a transmitting mode of transmitting the light incident thereon and a scattering mode of scattering the light incident thereon,
a scattering direction of the first light-modulating element is different from a scattering direction of the second light-modulating element,
timing of setting the first light-modulating element to the scattering mode is different from timing of setting the second light-modulating element to the scattering mode.

13. The optical device according to claim 12, wherein
the second light-modulating element scatters the light transmitted in the first light-modulating element, and transmits the light scattered in the first light-modulating element.

14. The optical device according to claim 13, wherein
the first light-modulating element includes a first main surface, and the second light-modulating element includes a second main surface,
a scattering direction of the first light-modulating element is a first direction in the first main surface,
a scattering direction of the second light-modulating element is a second direction in the second main surface, and
the first direction and the second direction intersect each other.

15. The optical device according to claim 14, wherein
the first main surface and the second main surface are parallel and are arranged with a third direction intersecting the first direction and the second direction.

16. The optical device according to claim 14, wherein
the first light-modulating element and the second light-modulating element are shaped in a flat plate, and
the first light-modulating element and the second light-modulating element are arranged with a third direction intersecting the first direction and the second direction.

17. The optical device according to claim 12, wherein
each of the first light-modulating element and the second light-modulating element includes a liquid crystal device which comprises a polymer dispersing liquid crystal layer, and a first electrode and a second electrode which apply voltages to the polymer dispersing liquid crystal layer.

18. The optical device according to claim 17, wherein
each of the first light-modulating element and the second light-modulating element further comprises a horizontal alignment film, and
the polymer dispersing liquid crystal layer contains a liquid crystal material having a positive dielectric anisotropy.

19. The optical device according to claim 17, wherein
each of the first light-modulating element and the second light-modulating element further comprises a vertical alignment film, and
the polymer dispersing liquid crystal layer contains a liquid crystal material having a negative dielectric anisotropy.

20. The optical device according to claim 12, further comprising:
a half-wave plate between the first light-modulating element and the second light-modulating element.

* * * * *